United States Patent
Kim et al.

(10) Patent No.: US 12,212,443 B2
(45) Date of Patent: Jan. 28, 2025

(54) METHOD AND DEVICE FOR TRANSMITTING/RECEIVING SIGNAL IN WIRELESS COMMUNICATION SYSTEM

(71) Applicant: LG ELECTRONICS INC., Seoul (KR)

(72) Inventors: Minseog Kim, Seoul (KR); Sunam Kim, Seoul (KR); Jaehwan Kim, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 18/001,835

(22) PCT Filed: Jun. 18, 2020

(86) PCT No.: PCT/KR2020/007921
§ 371 (c)(1),
(2) Date: Dec. 14, 2022

(87) PCT Pub. No.: WO2021/256585
PCT Pub. Date: Dec. 23, 2021

(65) Prior Publication Data
US 2023/0254189 A1      Aug. 10, 2023

(51) Int. Cl.
*H04L 27/26*      (2006.01)

(52) U.S. Cl.
CPC .............................. *H04L 27/2601* (2013.01)

(58) Field of Classification Search
CPC . H04L 27/2601; H04L 27/28; H04L 27/2602; H04L 27/2605; H04L 5/0007; H04L 5/0012
See application file for complete search history.

(56) References Cited

U.S. PATENT DOCUMENTS

| | | | |
|---|---|---|---|
| 11,616,671 B1 * | 3/2023 | Sakhnini | H04L 5/0098 375/262 |
| 2021/0068115 A1 * | 3/2021 | Gotoh | H04W 72/0453 |
| 2023/0135780 A1 * | 5/2023 | Sakhnini | H04L 27/2636 370/329 |

(Continued)

FOREIGN PATENT DOCUMENTS

| | | |
|---|---|---|
| KR | 10-1275851 | 6/2013 |
| KR | 10-2018-0100047 | 9/2018 |
| WO | 2017-117489 | 7/2017 |

OTHER PUBLICATIONS

PCT International Application No. PCT/KR2020/007921, International Search Report dated Mar. 5, 2021, 6 page.

(Continued)

*Primary Examiner* — Khanh C Tran
(74) *Attorney, Agent, or Firm* — LEE, HONG, DEGERMAN, KANG & WAIMEY

(57) ABSTRACT

A method of operating a terminal and a base station in a wireless communication system and an apparatus supporting the same are disclosed. As an example, a method of operating a terminal in a wireless communication system comprises receiving information related to a configuration for a unique word (UW) from a base station, receiving UW-orthogonal frequency division multiplexing (OFDM) symbols including data from the base station, and processing the UW-OFDM symbols based on the information related to the configuration for the UW.

20 Claims, 30 Drawing Sheets

(56) References Cited

U.S. PATENT DOCUMENTS

2023/0254189 A1* 8/2023 Kim .................. H04L 27/01
   375/260

OTHER PUBLICATIONS

Mitsubishi Electric, "UW DFTsOFDM performance evaluation above 40GHz," R1-1700649, 3GPP TSG-RAN WG1 NR-AH 1701, Jan. 2017, 12 pages.
Mitsubishi Electric, "Performance evaluations of UW-DFT-s-OFDM in the 30GHz high speed train scenario," R1-1700878, 3GPP TSG-RAN WG1 NR AH, Jan. 2017, 9 pages.

* cited by examiner

METHOD AND DEVICE FOR TRANSMITTING/RECEIVING SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2020/007921, filed on Jun. 18, 2020, the contents of which is hereby incorporated by reference herein in its entirety.

TECHNICAL FIELD

The following description relates to a wireless communication system, and, more particularly, to a method and an apparatus for transmitting and receiving a signal in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a method and apparatus for transmitting and receiving a signal in a wireless communication system.

The present disclosure may provide a method and apparatus for generating and interpreting a unique word (UW)-orthogonal frequency division multiplexing (OFDM) symbol.

The technical objects to be achieved in the present disclosure are not limited to the above-mentioned technical objects, and other technical objects that are not mentioned may be considered by those skilled in the art through the embodiments described below.

The present disclosure may provide a method and apparatus for transmitting and receiving a signal in a wireless communication system.

As an example of the present disclosure, a method of operating a terminal in a wireless communication system may comprise receiving information related to a configuration for a unique word (UW) from a base station, receiving UW-orthogonal frequency division multiplexing (OFDM) symbols including data from the base station, and processing the UW-OFDM symbols based on the information related to the configuration for the UW.

As an example of the present disclosure, a method of operating a base station in a wireless communication system may comprise transmitting information related to a configuration for a unique word (UW) and transmitting UW-orthogonal frequency division multiplexing (OFDM) symbols generated according to the configuration for the UW.

As an example of the present disclosure, in a wireless communication system, a terminal may include a transceiver and a processor connected to the transceiver. The processor may perform control to receive information related to a configuration for a unique word (UW) from a base station, to receive UW-orthogonal frequency division multiplexing (OFDM) symbols including data from the base station, and to process the UW-OFDM symbols based on the information related to the configuration for the UW.

As an example of the present disclosure, in a wireless communication system, a base station may include a transceiver and a processor connected to the transceiver. The processor may perform control to transmit information related to a configuration for a unique word (UW) and to transmit UW-orthogonal frequency division multiplexing (OFDM) symbols generated according to the configuration for the UW.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, it is possible to adaptively control a structure of a unique word (UW)-orthogonal frequency division multiplexing (OFDM) symbol.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
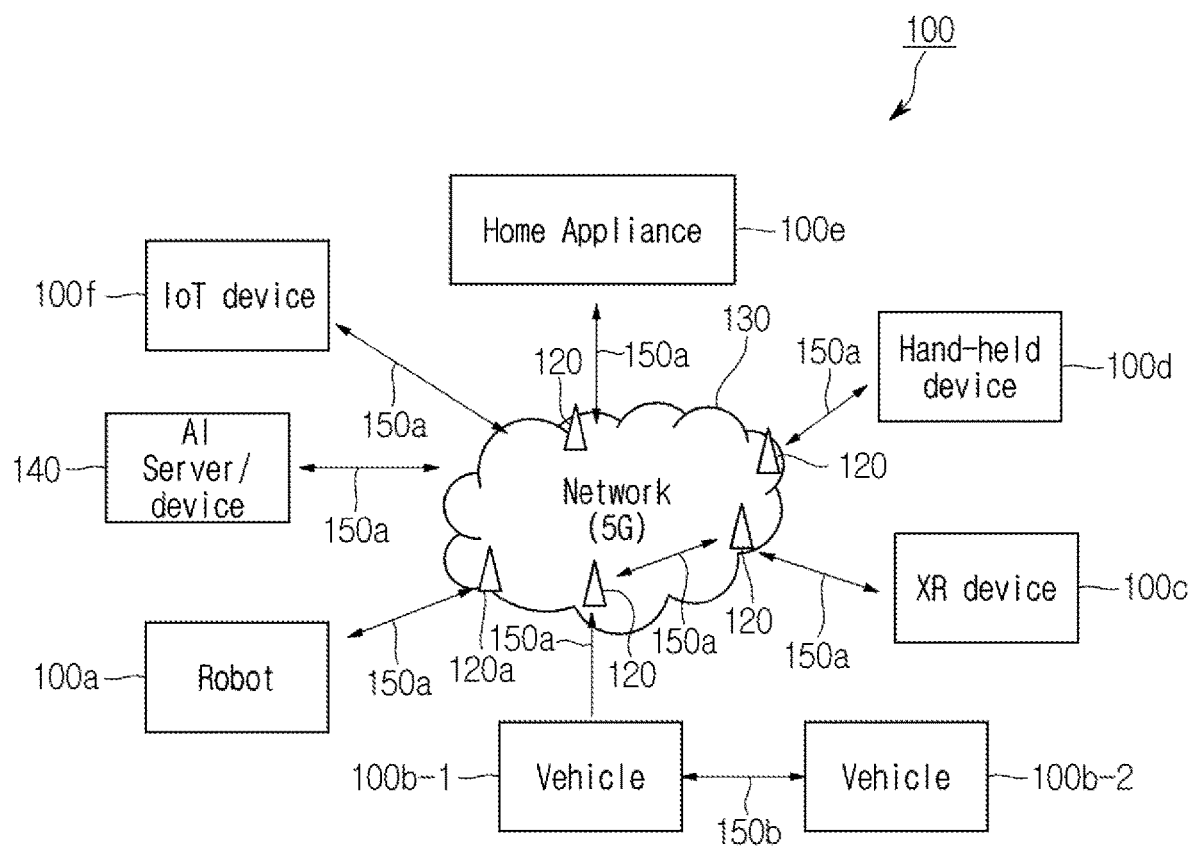
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, 3GPP 5$^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38. XXX Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.XXX.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include a unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a. 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Wireless Device Applicable to the Present Disclosure

Figure 2:
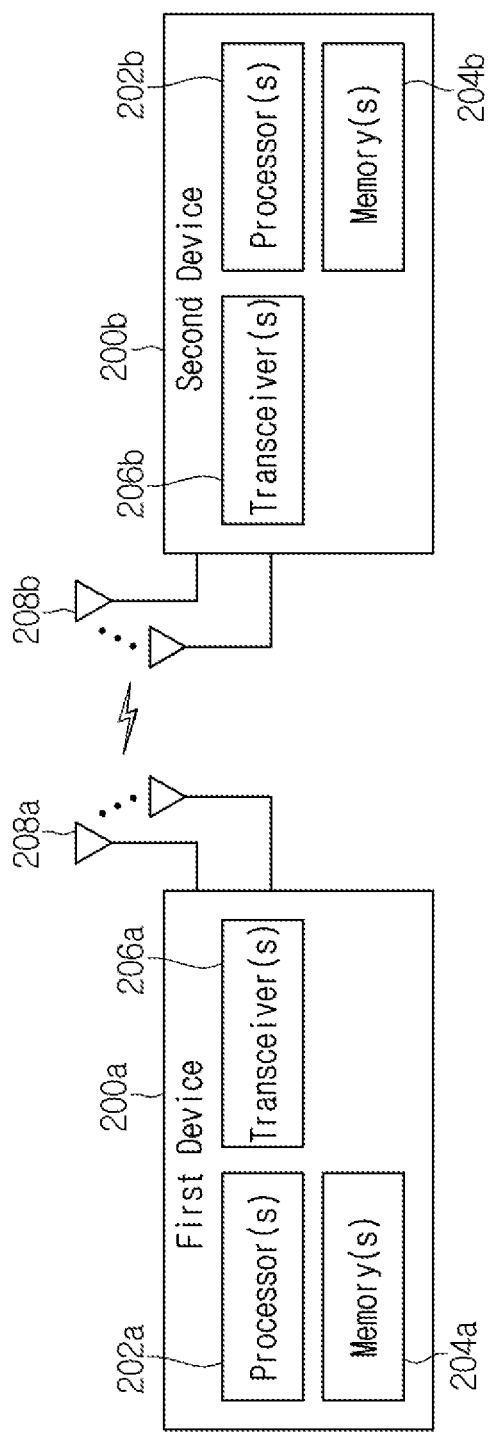
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
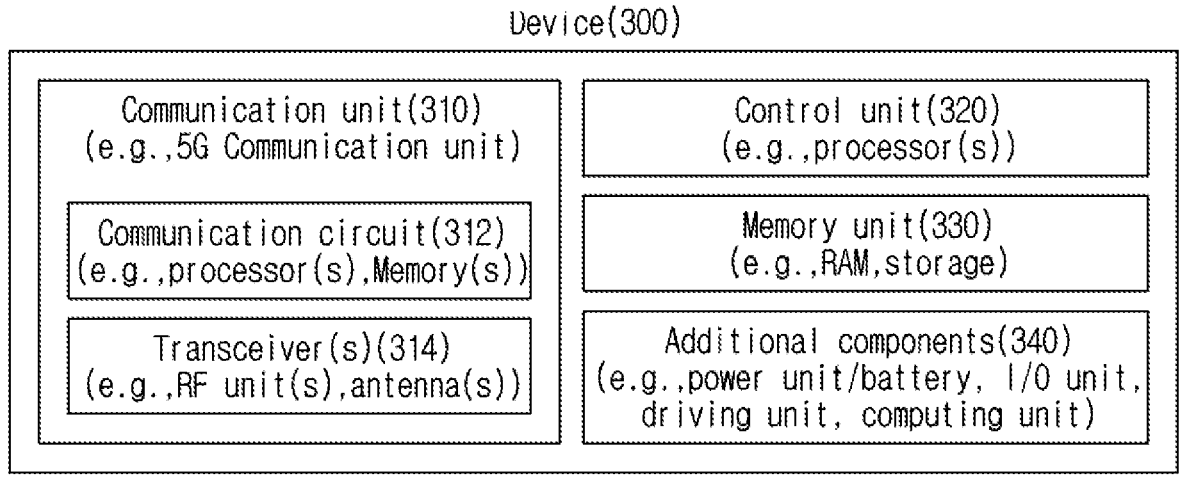
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
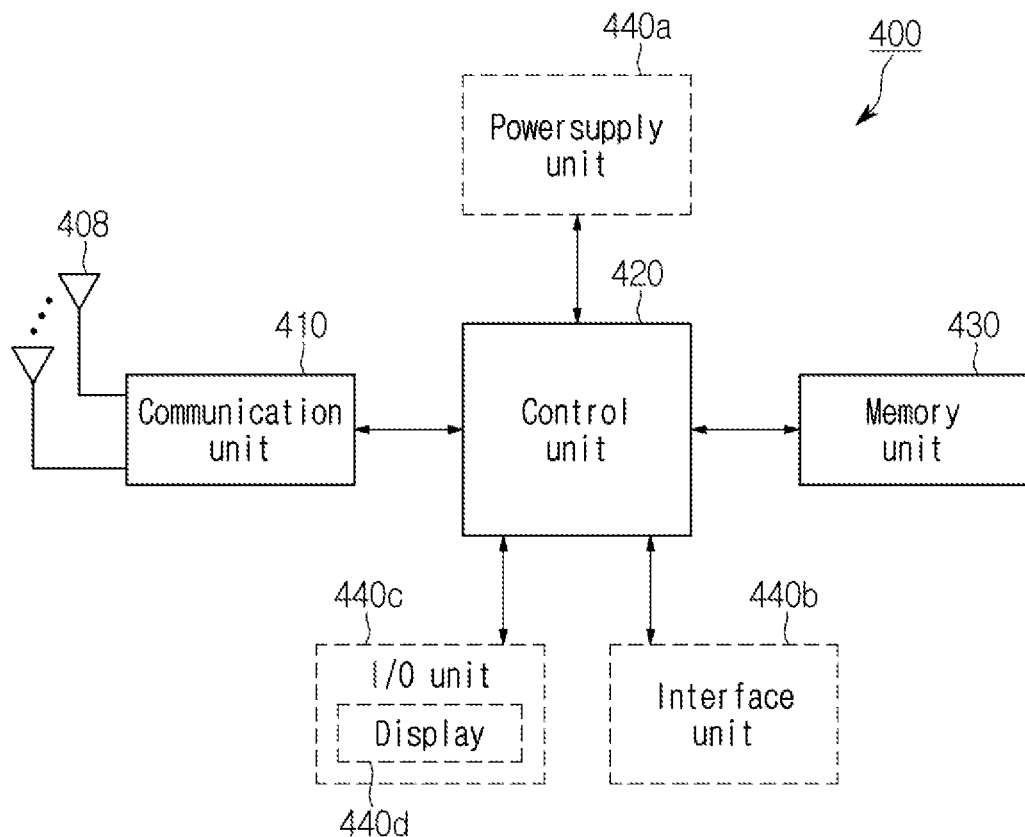
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
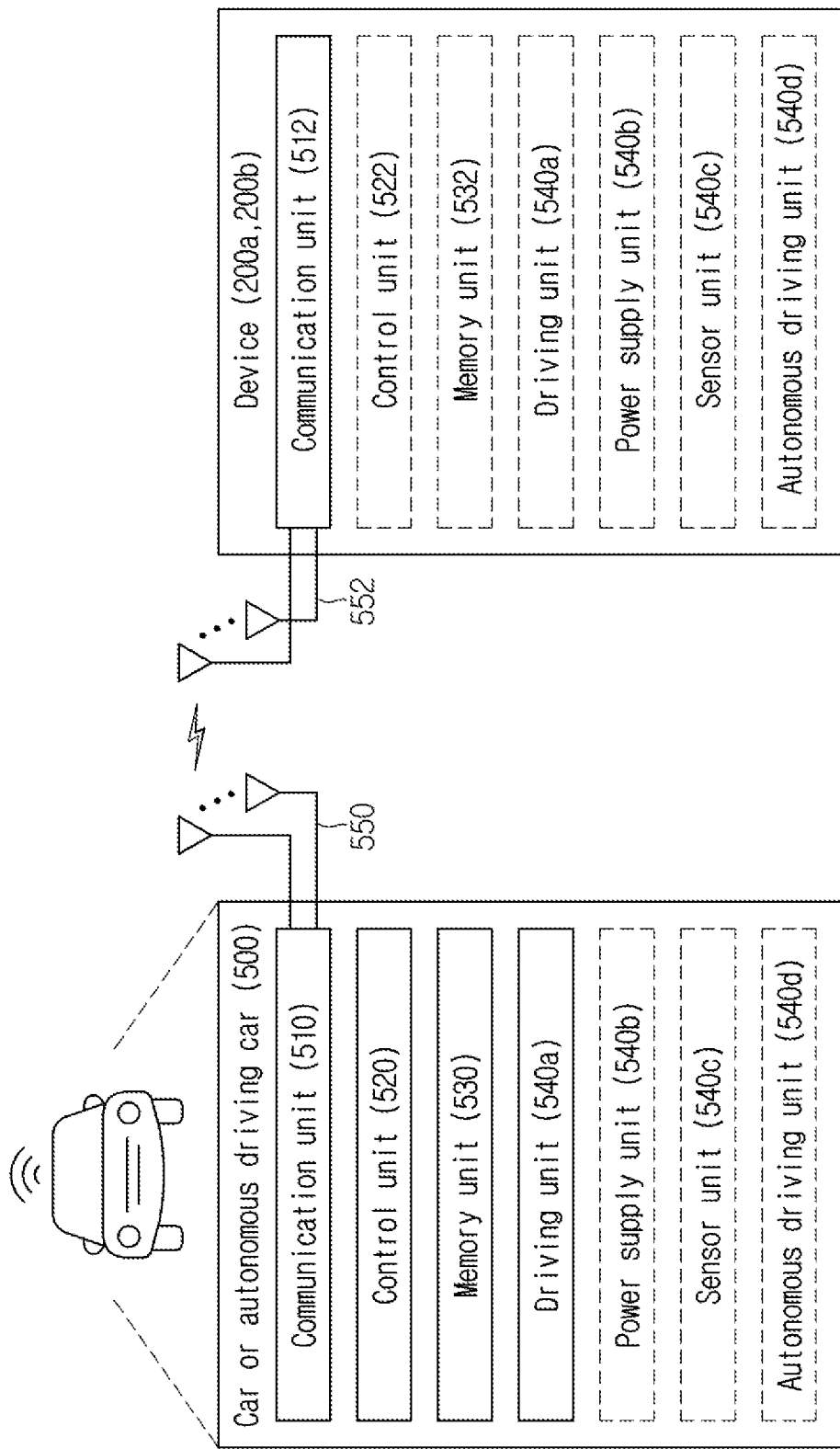
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540a may drive the car or autonomous driving car 500 on the ground. The driving unit 540a may include an engine, a motor, a power train, wheels, a brake, a steering device, etc. The power supply unit 540b may supply power to the car or autonomous driving car 500, and include a wired/wireless charging circuit, a battery, etc. The sensor unit 540c may obtain a vehicle state, surrounding environment information, user information, etc. The sensor unit 540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540d may generate an autonomous driving route and a driving plan based on the acquired data. The control unit 520 may control the driving unit 540a (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540c may acquire a vehicle state and surrounding environment information. The autonomous driving unit 540d may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
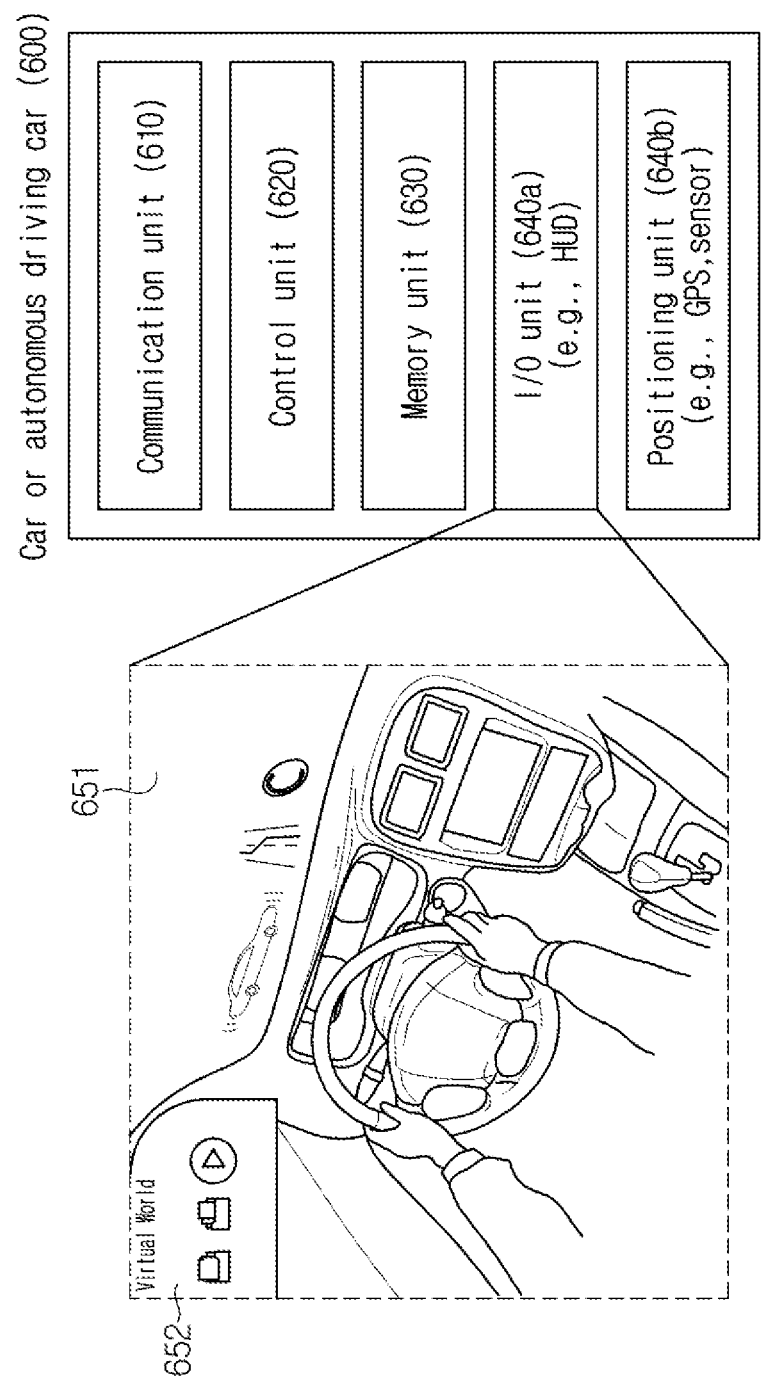
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640a and a positioning unit 640b. Here, the blocks 610 to 630/640a to 640b may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640a may output AR/VR objects based on information in the memory unit 630. The input/output unit 640a may include a HUD. The positioning unit 640b may acquire the position information of the mobility 600. The position information may include absolute position information of the mobility 600, position information in a driving line, acceleration information, position information of neighboring vehicles, etc. The positioning unit 640b may include a global positioning system (GPS) and various sensors.

For example, the communication unit 610 of the mobility 600 may receive map information, traffic information, etc. from an external server and store the map information, the traffic information, etc. in the memory unit 630. The positioning unit 640b may acquire mobility position information through the GPS and the various sensors and store the mobility position information in the memory unit 630. The control unit 620 may generate a virtual object based on the map information, the traffic information, the mobility position information, etc., and the input/output unit 640a may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640a. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
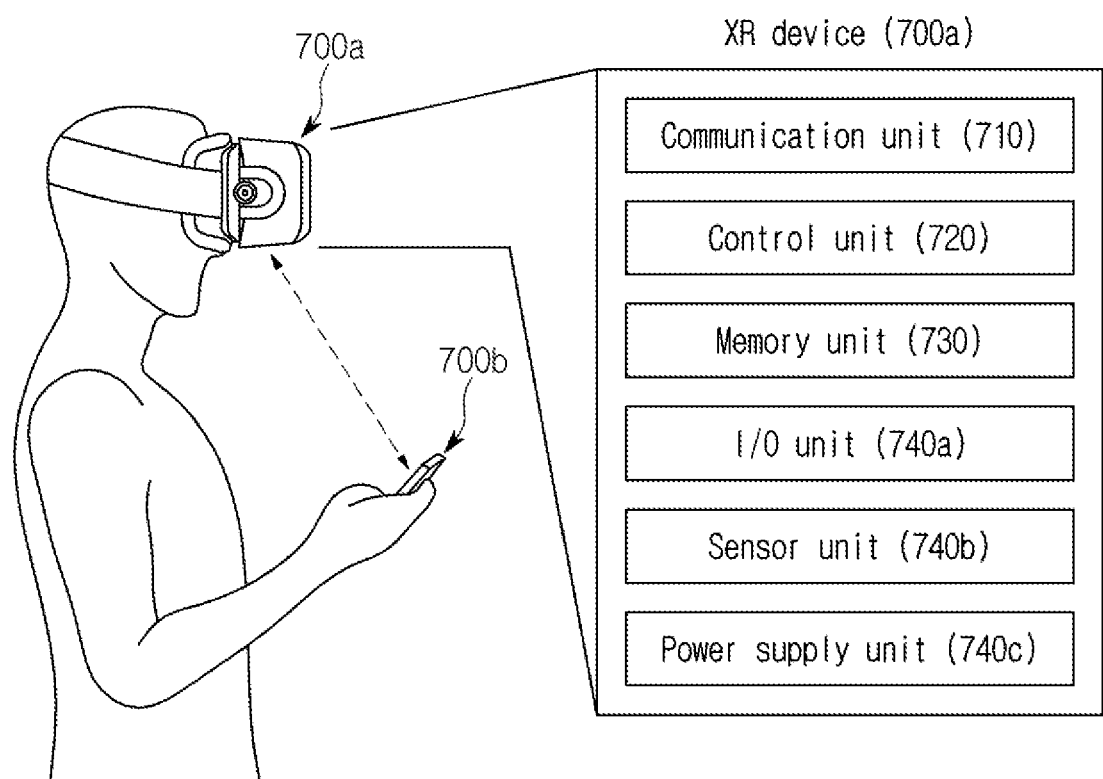
FIG. 7 is a view showing an example of an XR device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700a may include a communication unit (transceiver) 710, a control unit (controller) 720, a memory unit (memory) 730, an input/output unit 740a, a sensor unit 740b and a power supply unit (power supply) 740c. Here, the blocks 710 to 730/740a to 740c may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700a to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700a or generate an XR object.

The input/output unit 740a may acquire control information, data, etc. from the outside and output the generated XR object. The input/output unit 740a may include a camera, a microphone, a user input unit, a display, a speaker and/or a haptic module. The sensor unit 740b may obtain an XR device state, surrounding environment information, user information, etc. The sensor unit 740b may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740c may supply power to the XR device 700a and include a wired/wireless charging circuit, a battery, etc.

For example, the memory unit 730 of the XR device 700a may include information (e.g., data, etc.) necessary to generate an XR object (e.g., AR/VR/MR object). The input/output unit 740a may acquire an instruction for manipulating the XR device 700a from a user, and the control unit 720 may drive the XR device 700a according to the driving instruction of the user. For example, when the user wants to watch a movie, news, etc. through the XR device 700a, the control unit 720 may transmit content request information to another device (e.g., a hand-held device 700b) or a media server through the communication unit 730. The communication unit 730 may download/stream content such as a movie or news from another device (e.g., the hand-held device 700b) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740a or the sensor unit 740b.

In addition, the XR device 700a may be wirelessly connected with the hand-held device 700b through the communication unit 710, and operation of the XR device 700a may be controlled by the hand-held device 700b. For example, the hand-held device 700b may operate as a controller for the XR device 700a. To this end, the XR device 700a may acquire three-dimensional position information of the hand-held device 700b and then generate and output an XR object corresponding to the hand-held device 700b.

Figure 8:
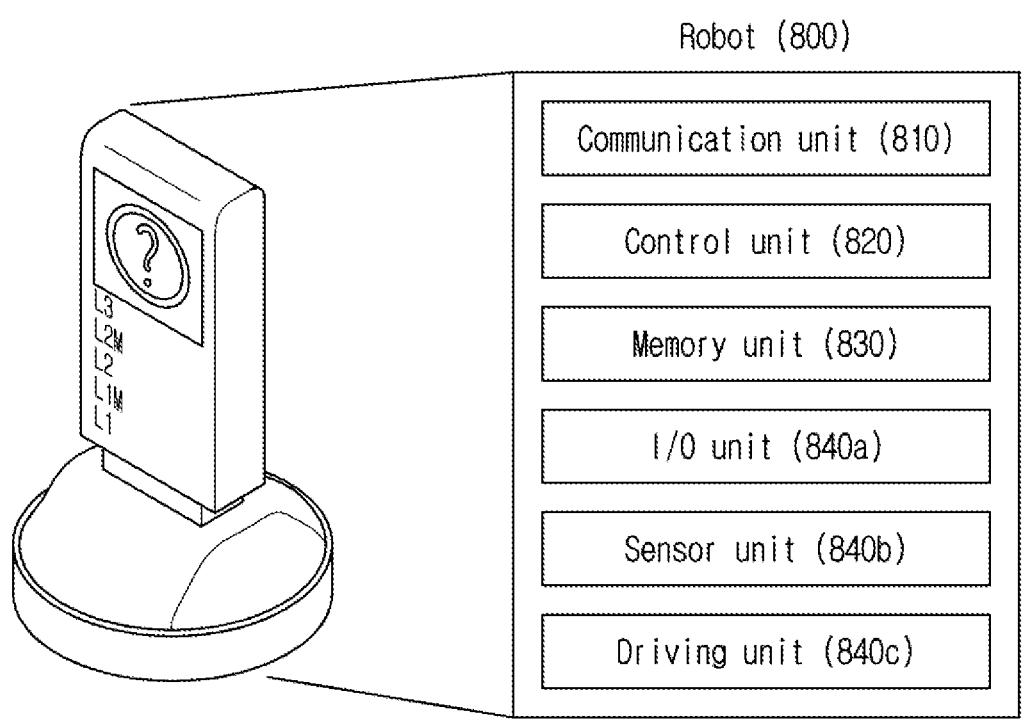
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840a, sensor unit 840*b* and a driving unit 840*c*. Here, blocks 810 to 830/840*a* to 840*c* may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840*a* may acquire information from the outside of the robot 800 and output information to the outside of the robot 800. The input/output unit 840*a* may include a camera, a microphone, a user input unit, a display, a speaker and/or a haptic module.

The sensor unit 840*b* may obtain internal information, surrounding environment information, user information, etc. of the robot 800. The sensor unit 840*b* may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840*c* may perform various physical operations such as movement of robot joints. In addition, the driving unit 840*c* may cause the robot 800 to run on the ground or fly in the air. The driving unit 840*c* may include an actuator, a motor, wheels, a brake, a propeller, etc.

Figure 9:
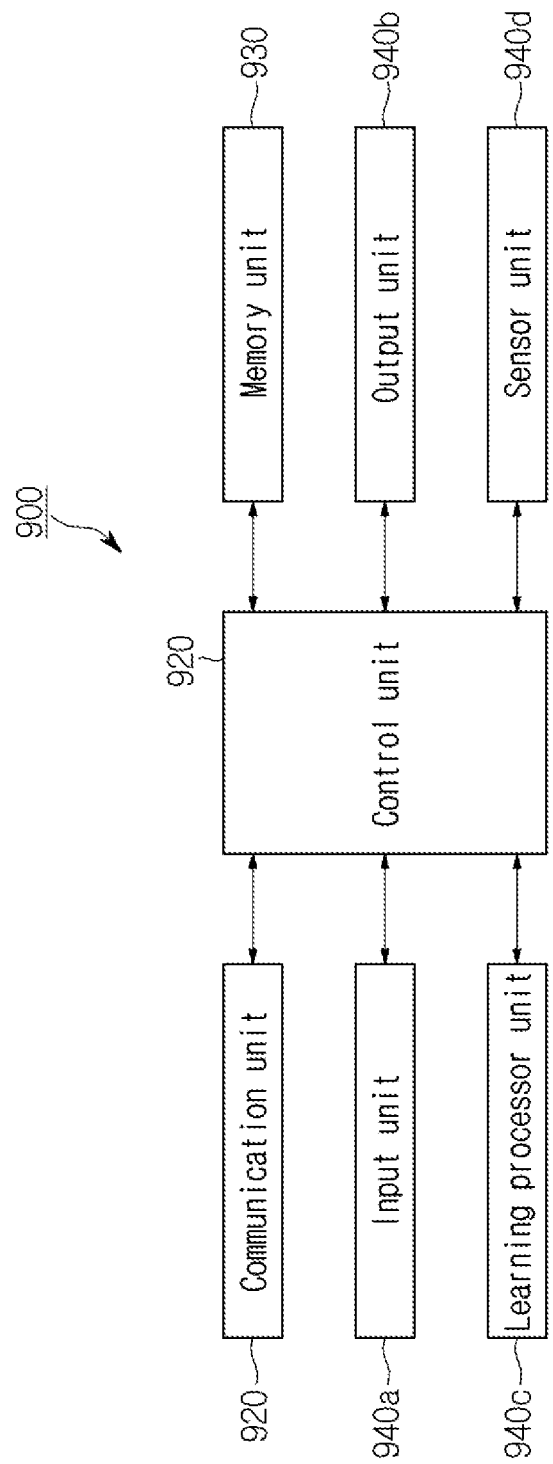
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940*a*/940*b*, a leaning processor unit (learning processor) 940*c* and a sensor unit 940*d*. The blocks 910 to 930/940*a* to 940*d* may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940*c* or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940*c* or transmit the history information to the AI server (FIG. 1, 140). The collected history information may be used to update a learning model.

The memory unit 930 may store data supporting various functions of the AI device 900. For example, the memory unit 930 may store data obtained from the input unit 940*a*, data obtained from the communication unit 910, output data of the learning processor unit 940*c*, and data obtained from the sensing unit 940. In addition, the memory unit 930 may store control information and/or software code necessary to operate/execute the control unit 920.

The input unit 940*a* may acquire various types of data from the outside of the AI device 900. For example, the input unit 940*a* may acquire learning data for model learning, input data, to which the learning model will be applied, etc. The input unit 940*a* may include a camera, a microphone and/or a user input unit. The output unit 940*b* may generate video, audio or tactile output. The output unit 940*b* may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940*c* may train a model composed of an artificial neural network using training data. The learning processor unit 940*c* may perform AI processing along with the learning processor unit of the AI server (FIG. 1, 140). The learning processor unit 940*c* may process information received from an external device through the communication unit 910 and/or information stored in the memory unit 930. In addition, the output value of the learning processor unit 940*c* may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
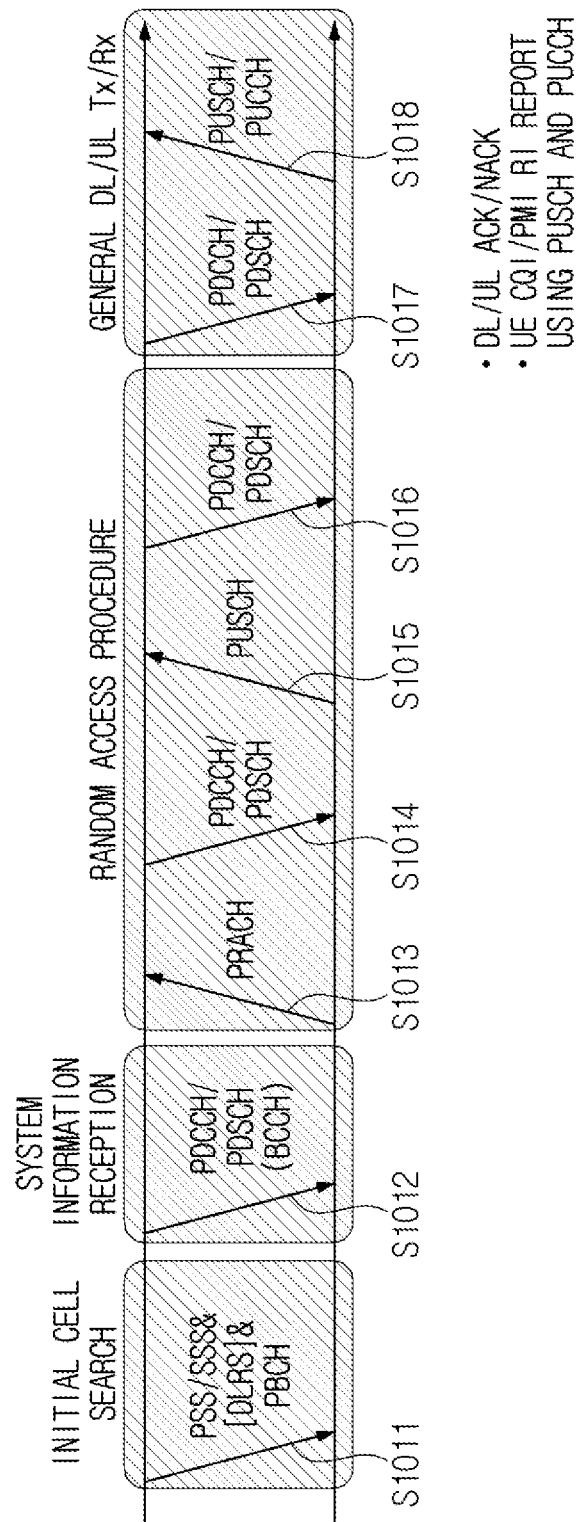
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
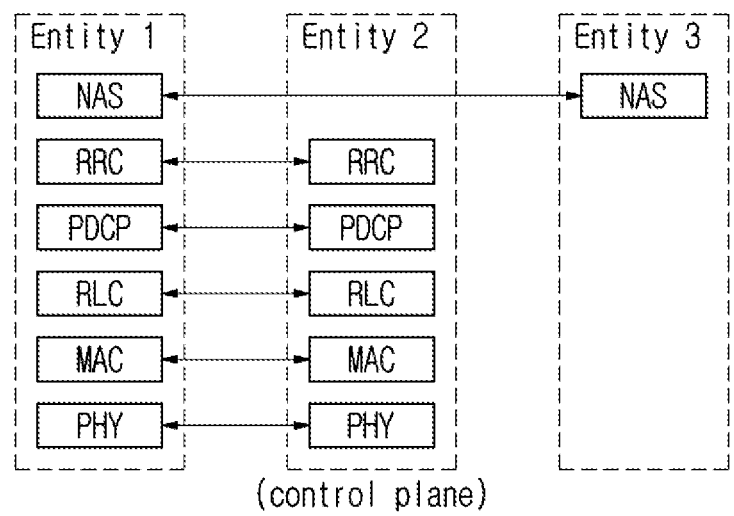
FIG. 11 is a view showing the structure of a control plane and a user plane of a radio interface protocol applicable to the present disclosure.
Figure 11:
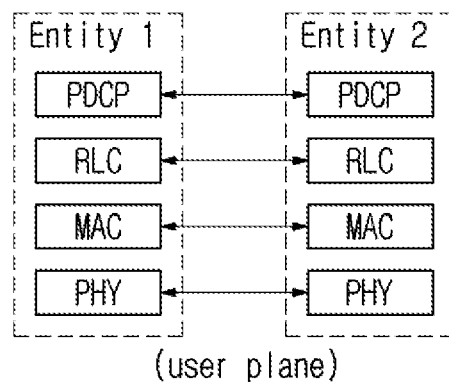

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control mess1ages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
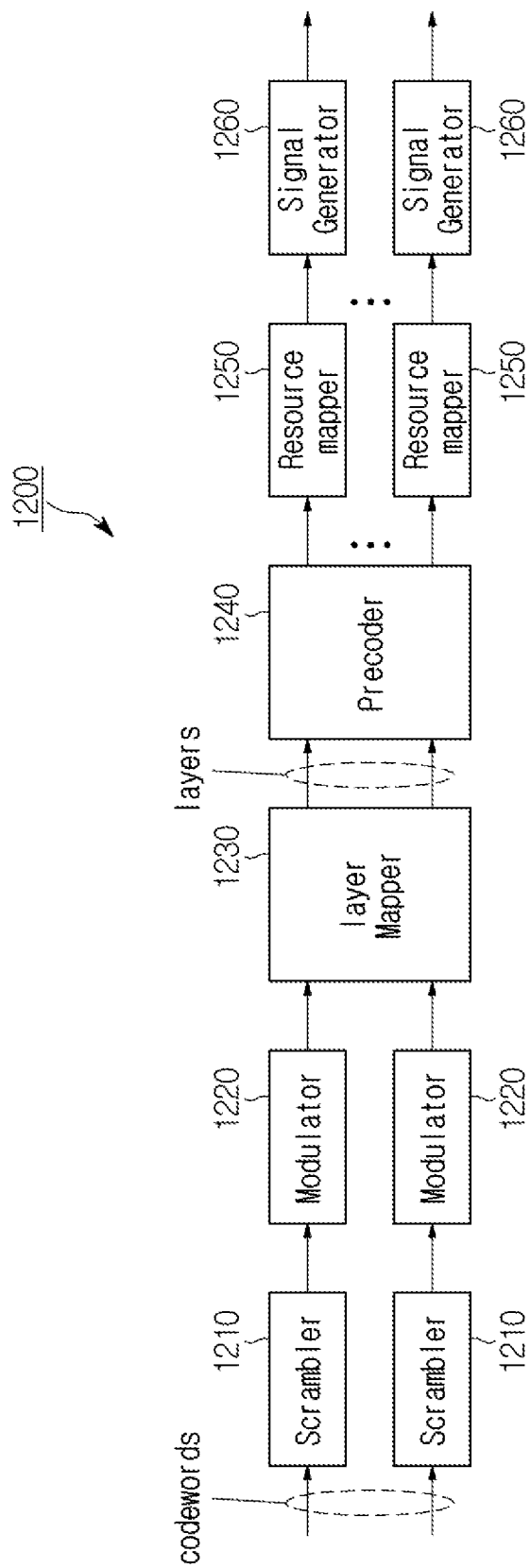
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240), a resource mapper 1250), and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240) may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
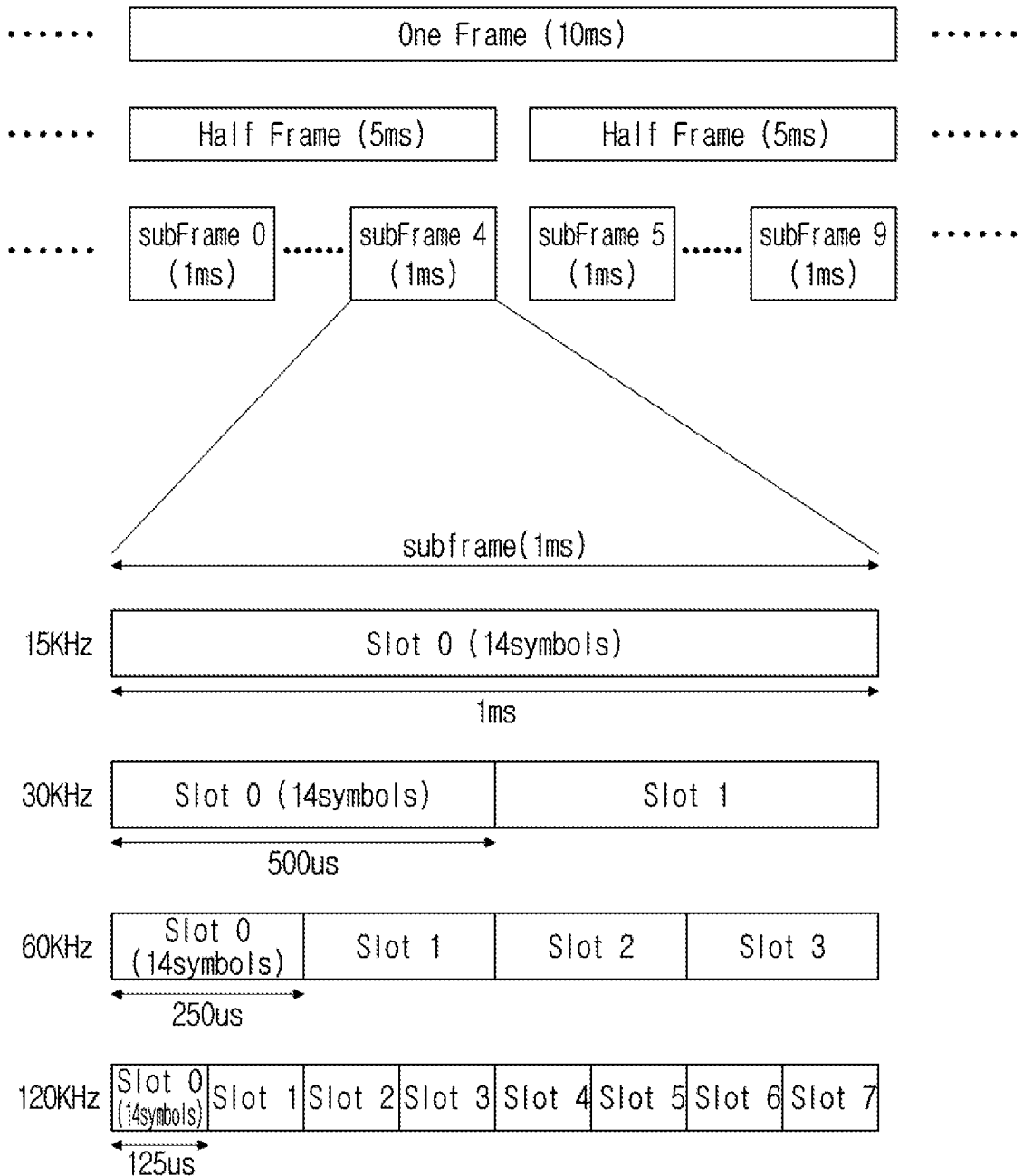
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM (A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N^{slot}_{symb}$ may indicate the number of symbols in a slot, $N^{frame,\mu}_{slot}$ may indicate the number of slots in a frame, and $N^{subframe,\mu}_{slot}$ may indicate the number of slots in a subframe.

In addition, in a system, to which the present disclosure is applicable, OFDM (A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 KHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
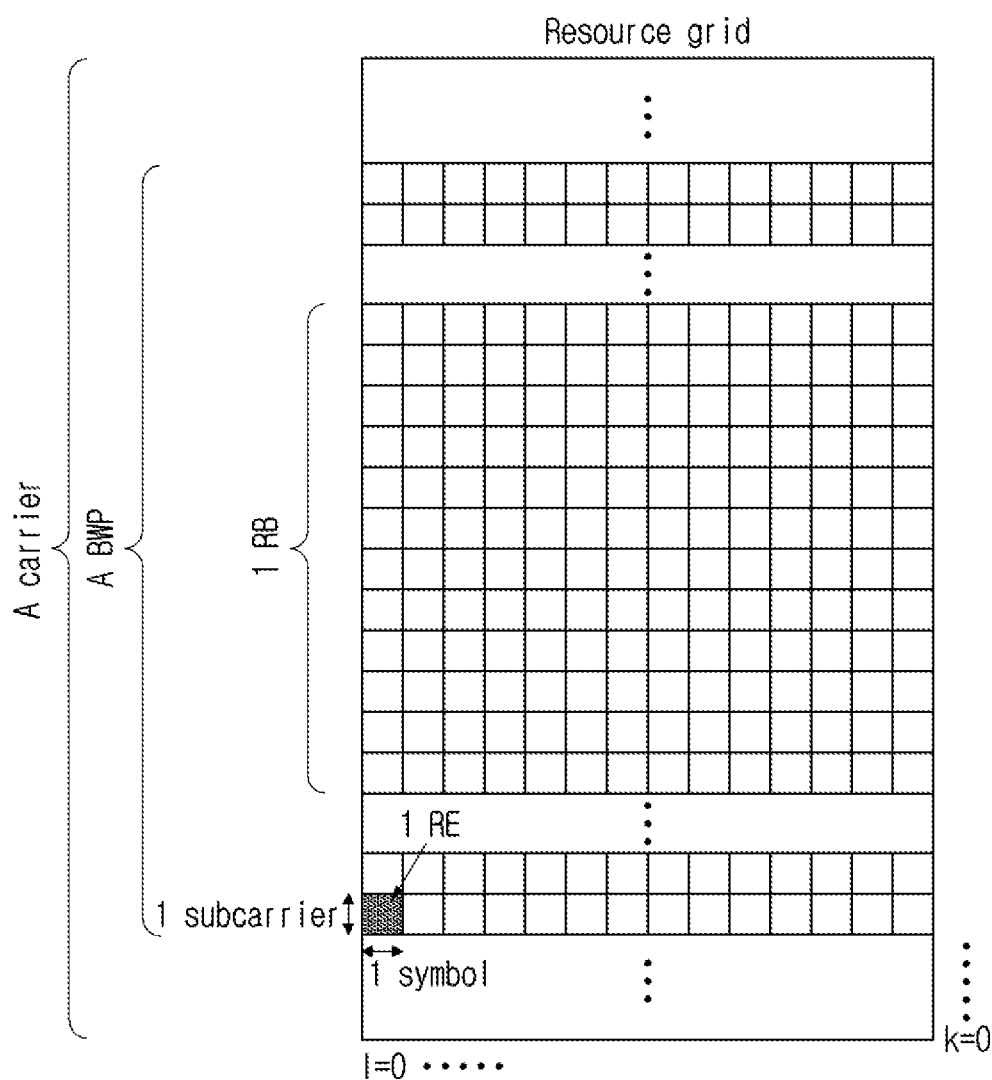
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
| --- | --- |
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
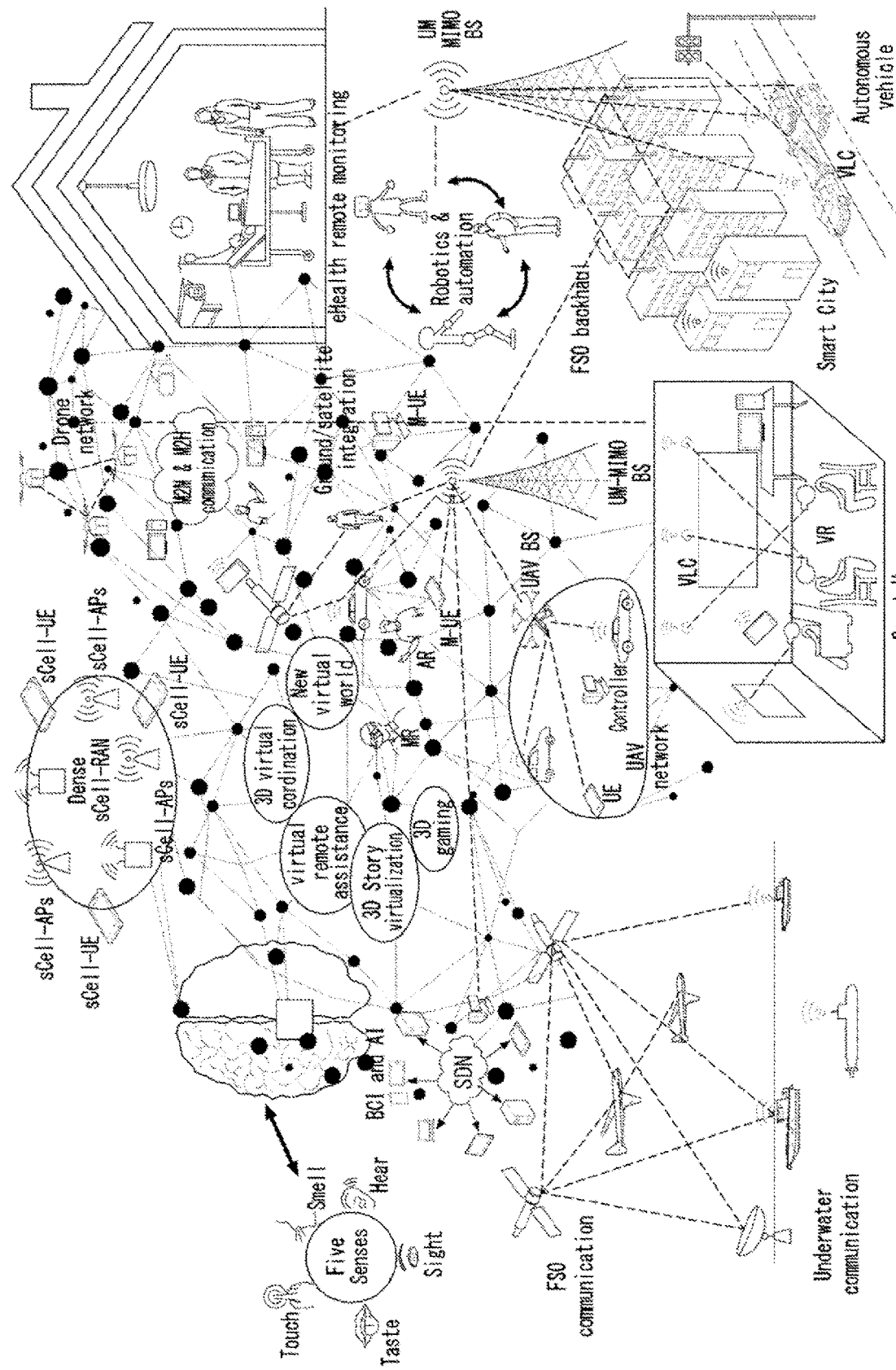
FIG. 15 is a view showing an example of a communication structure providable in a 6G system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System
-Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 16:
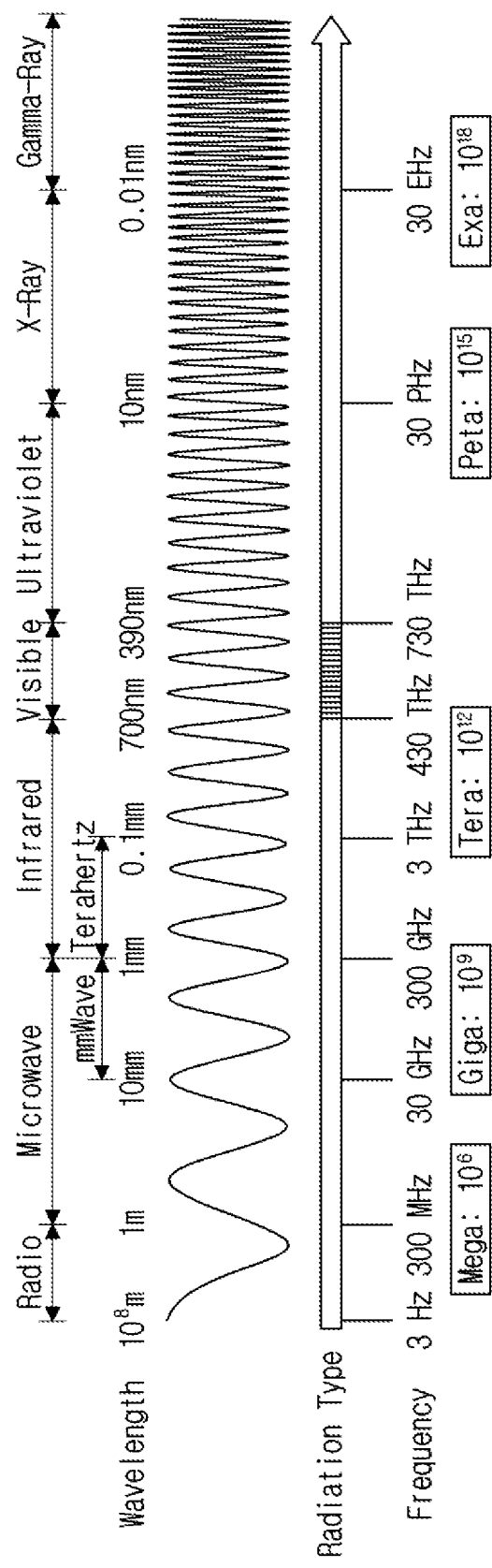
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
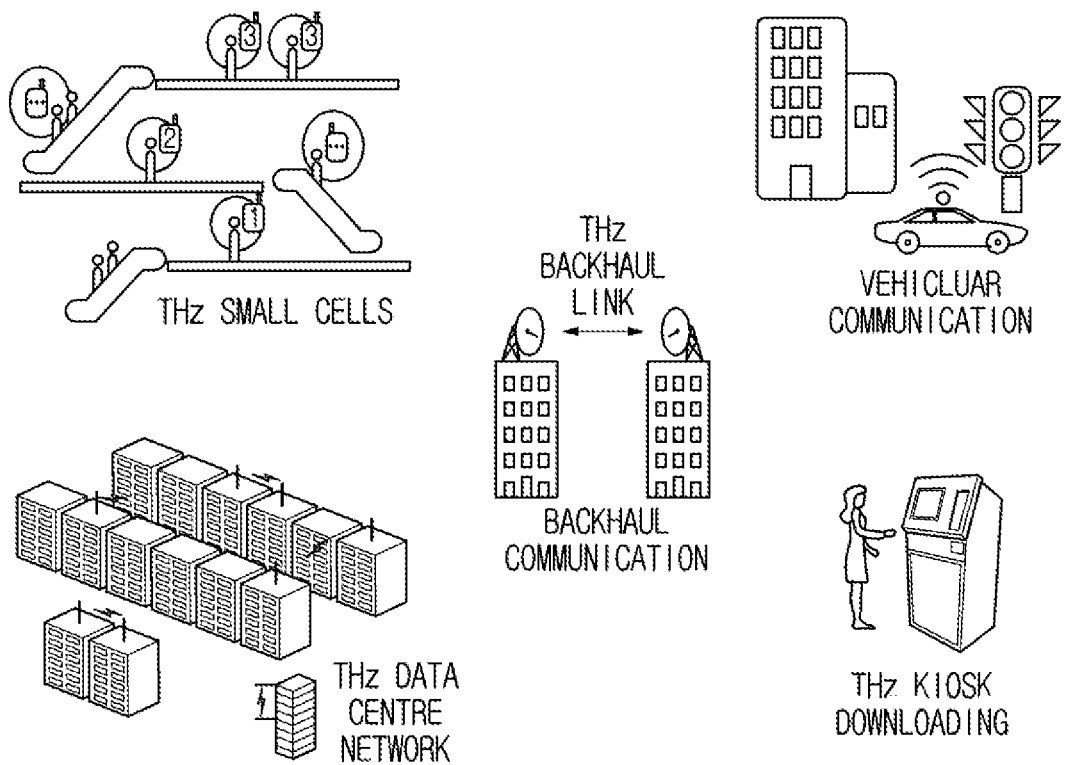
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multipoint connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
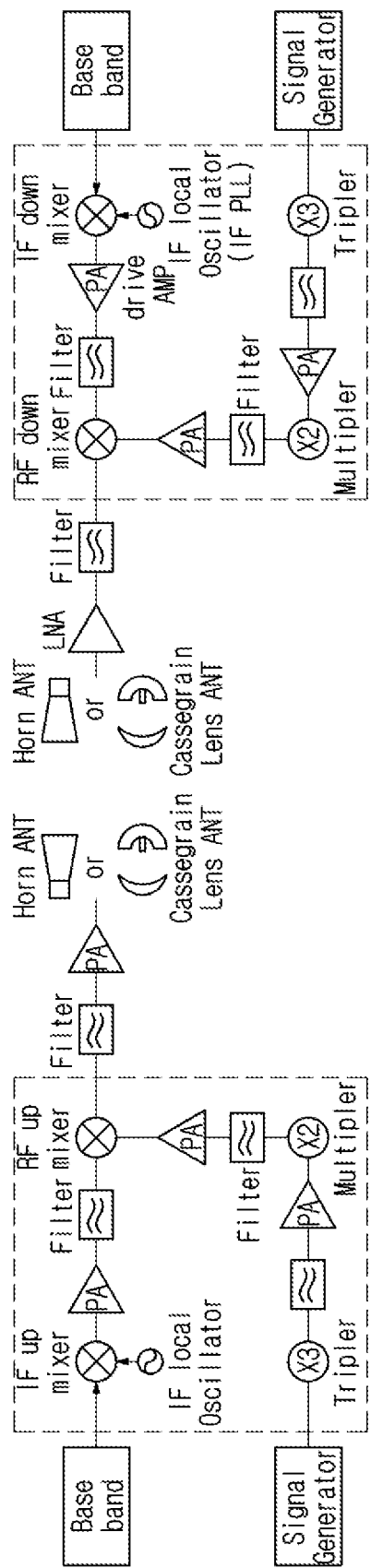
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
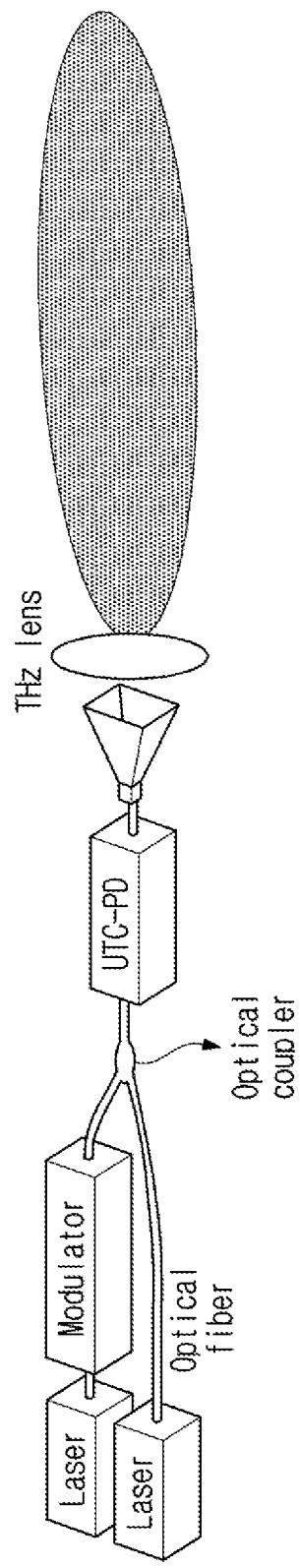
FIG. 19 is a view showing a THz signal generation method applicable to the present disclosure.
Figure 20:
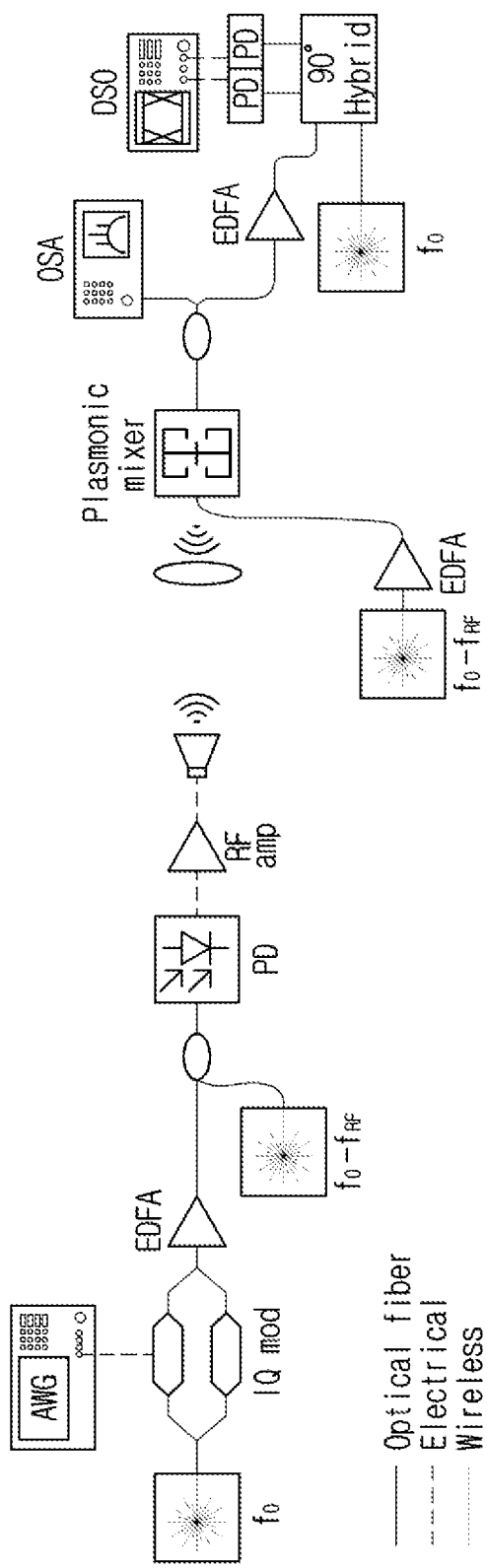
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
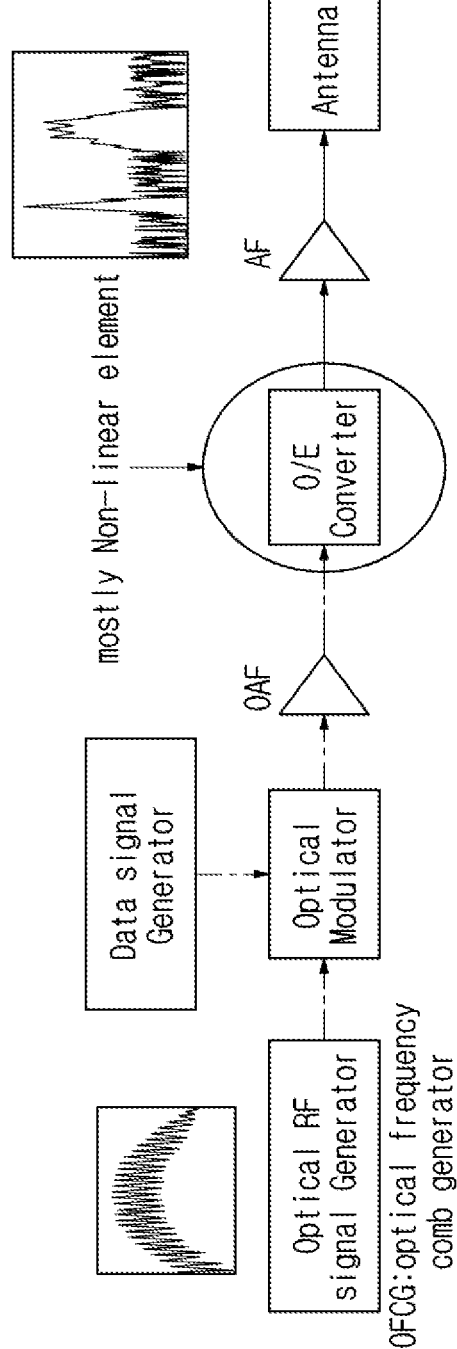
FIG. 21 is a view showing a transmitter structure applicable to the present disclosure.
Figure 22:
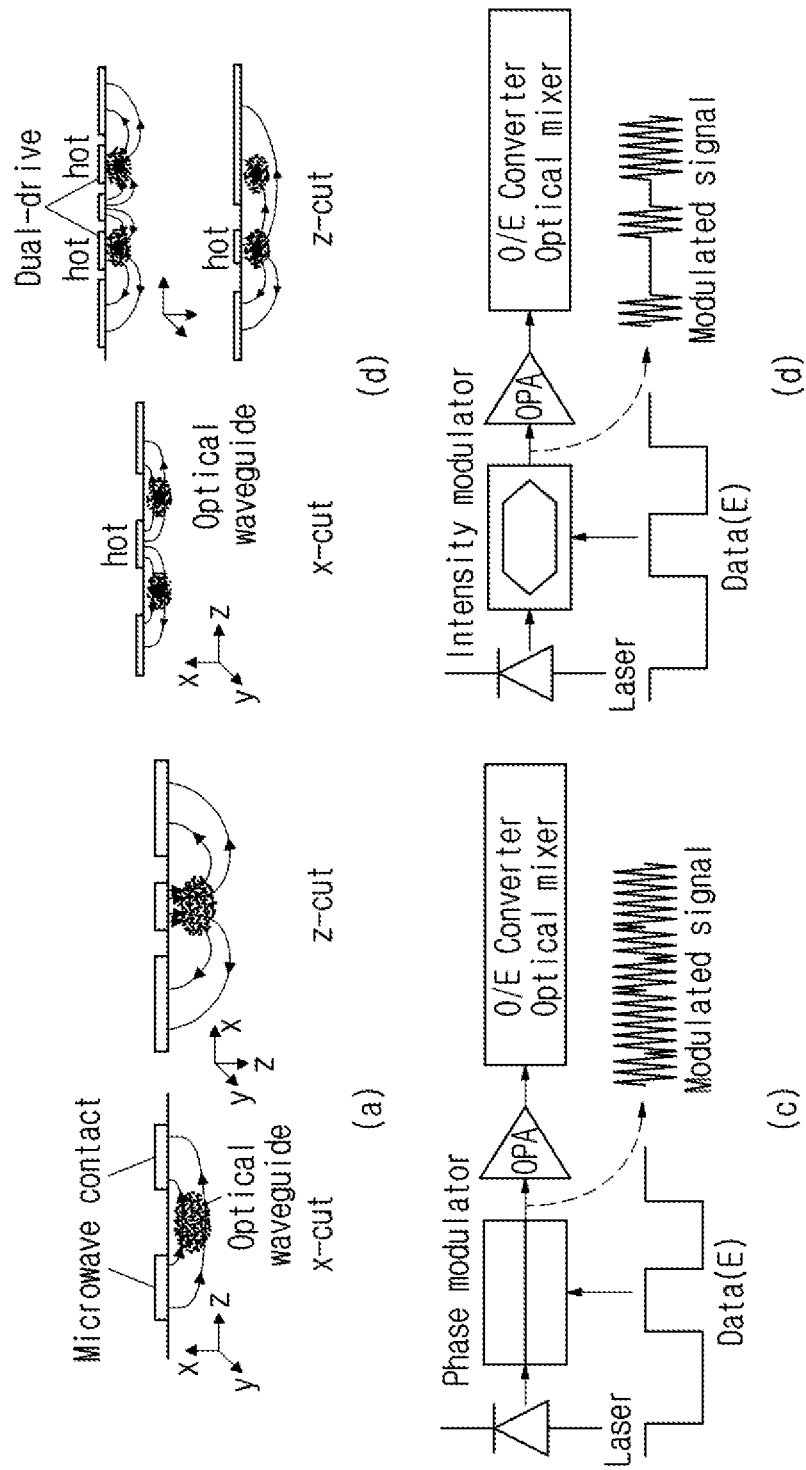
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHZ.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Specific Embodiment of Present Disclosure

In the following description, technology for transmitting and receiving a signal according to a unique word (UW)-orthogonal frequency division multiplexing (OFDM) technique will be described. Specifically, the present disclosure describes technology for adaptively controlling a UW-related configuration and supporting control-related signaling in utilizing the UW-OFDM technique. According to various embodiments to be described later, while variably operating the UW in consideration of a channel condition, an operation purpose, etc., redundancy required for UW transmission may be minimized and system performance may be improved.

UW-OFDM is a waveform in which CP is replaced with a UW, which is a deterministic sequence, in cyclic prefix (CP)-OFDM. The UW may be used for synchronization acquisition, channel estimation, phase noise estimation, and the like. Since the UW is included in a discrete Fourier transform (DFT) window, cyclicity is guaranteed. In addition, when UW-OFDM is used, unlike CP-OFDM, power and time resource consumed for CP transmission are saved. The structure of a UW-OFDM symbol is shown in FIG. 23.

Figure 23:
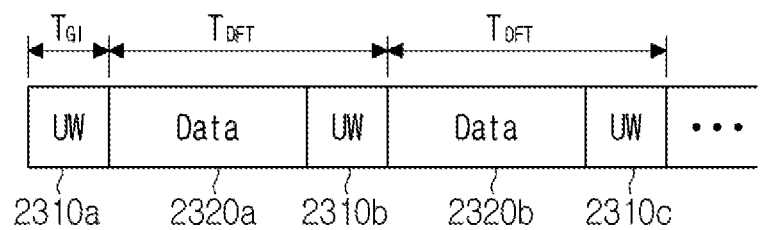
FIG. 23 is a diagram illustrating a structure of a symbol applicable to the present disclosure.

FIG. 23 is a diagram illustrating a structure of a symbol applicable to the present disclosure. FIG. 23 illustrates a plurality of UW-OFDM symbols. Referring to FIG. 23, UW-OFDM symbols are configured in a form in which a UW 2310a, data 2320a, a UW 2310b, data 2320b, and a UW 2310c are concatenated in the time domain. A pair of one data 2320a or 2320b and one UW 2320b or 2320c constitutes one UW-OFDM symbol, and one UW-OFDM symbol is included in a TDFT duration. That is, unlike the CP of the CP-OFDM symbol currently used in LTE and 5G systems, the UW of the UW-OFDM symbol is subjected to DFT or FFT (fast Fourier transform) operation along with data.

In the case of FIG. 23, one UW 2320a is arranged before a first UW-OFDM symbol. In order to perform channel estimation, phase noise estimation, and the like using a UW, it is advantageous that a UW is arranged at both front and rear ends of data in the UW-OFDM symbol. Thus, in the example of FIG. 23, the first UW 2320a is arranged without data. However, according to another embodiment, the UW-OFDM symbol may be configured except for the first UW 2320a.

Figure 24:
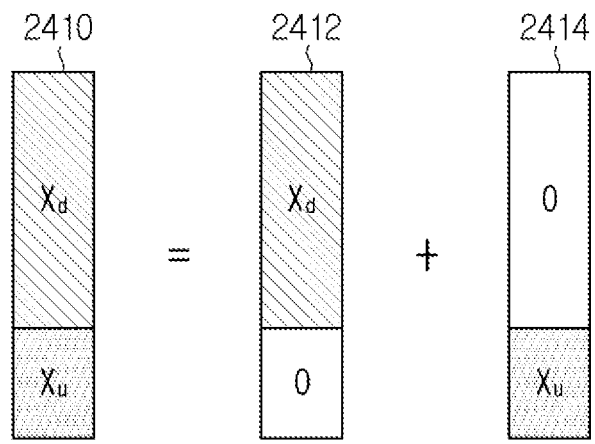
FIG. 24 is a diagram illustrating an example of a method of inserting a unique word (UW) into a symbol applicable to the present disclosure.

An example of generating the UW-OFDM symbol shown in FIG. 23 is shown in FIG. 24 below. FIG. 24 is a diagram illustrating an example of a method of inserting a UW into a symbol applicable to the present disclosure. Referring to FIG. 24, a UW of UW-OFDM may be generated through two steps. In a first step, a symbol 2412 containing a zero UW is generated. By designating some of all subcarriers as redundant subcarriers, an OFDM symbol having a specific area of 0 is generated within a symbol duration. In a second step, a UW-OFDM symbol 2410 is generated by adding a UW signal 2414 to be transmitted to a zero UW area of a previously generated OFDM symbol 2412 in the time domain.

Figure 25:
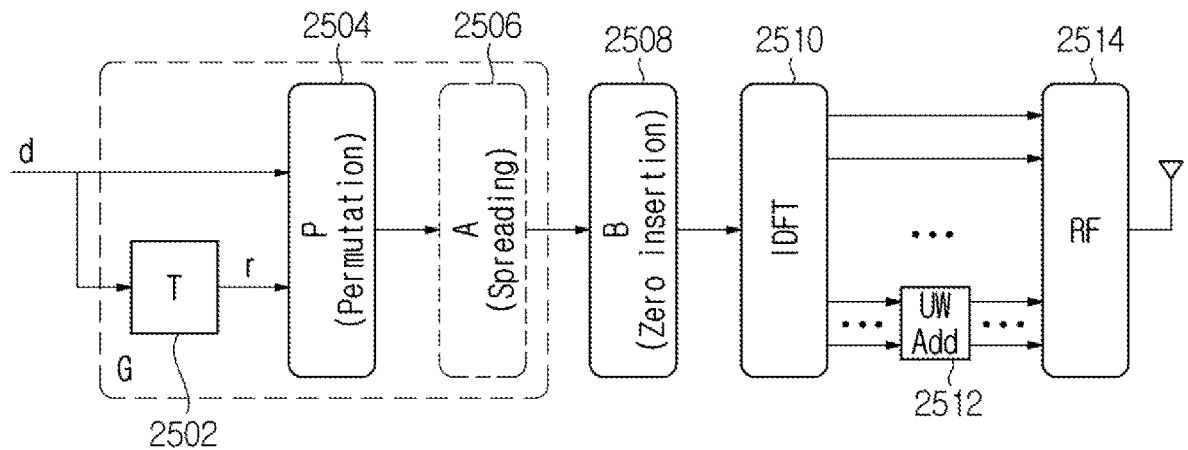
FIG. 25 is a diagram illustrating an example of a transmitter for generating a UW-OFDM symbol applicable to the present disclosure.

FIG. 25 is a diagram illustrating an example of a transmitter for generating a UW-OFDM symbol applicable to the present disclosure. The components illustrated in FIG. 25 are functional blocks, and the components may be physically implemented as one or more circuits.

Referring to FIG. 25, the transmitter includes a redundant generating unit 2502, a permutation unit 2504, a spreading unit 2506, and a zero insertion unit. 2508, an inverse DFT (IDFT) unit 2510, and a UW adding unit 2512.

The redundant generating unit 2502 adds redundant values to input data d. For this, the redundant generating unit 2502 uses a redundant generation matrix T. The permutation unit 2504 permutes a signal containing redundant values and data values. Here, the signal includes values in the frequency domain, and the redundant values are moved to a position of a redundant subcarrier by the permutation unit 2504. A combination of a permutation matrix P and a redundant generation matrix T used for permutation may be referred to as a code generation matrix G.

The spreading unit 2506 spreads values for each subcarrier included in the signal output from the permutation unit 2504. For this, the spreading unit 2506 uses a spreading matrix A. However, according to another embodiment, the spreading unit 2506 may be omitted. A structure in which a transmitter including the spreading unit 2506 is used may be referred to as a non-systematic coded UW-OFDM structure, and a structure in which a transmitter not including the spreading unit 2506 is used may be referred to as a systematic coded UW-OFDM structure.

The zero insertion unit 2508 inserts a zero value at a position corresponding to a DC (direct current) subcarrier and a guard band. In other words, the zero insertion unit 2508 maps a zero value to a DC subcarrier and subcarriers in the guard band. In some cases, the zero insertion unit 2508 may be omitted.

The IDFT unit 2510 performs an IDFT operation on a signal output from the zero insertion unit 2508, the spreading unit 2510, or the permutation unit 2504. Accordingly, the frequency domain signal is transformed into a time domain signal. In this case, the time domain signal is an OFDM symbol including a zero UW. According to another embodiment, the IDFT operation may be replaced with an IFFT operation.

The UW insertion unit 2512 inserts a UW into the time domain signal. In other words, the UW insertion unit 2512 adds the UW to a zero UW position of the OFDM symbol including the zero UW. Here, the sequence of the UW may be predefined or determined through signaling with a reception end.

According to the structure shown in FIG. 25, the transmitter makes a specific area of an OFDM symbol 0, and then inserts and transmits a UW in the corresponding area. As described above, a redundant subcarrier is used to generate a zero UW that makes a specific region 0 in the time domain. In order to generate a redundant subcarrier, an operation of multiplying a data symbol by a code generation matrix G composed of a permutation matrix P and a redundant generation matrix T is performed.

The above-described method of generating the UW-OFDM symbol using the zero UW is expressed as shown in Equation 1.

$$x' = F_N^{-1} BAP \begin{bmatrix} \tilde{d} \\ \tilde{r} \end{bmatrix} = \begin{bmatrix} x_d \\ 0_{N_u \times 1} \end{bmatrix} \quad \text{Equation 1}$$

In Equation 1, x' denotes a matrix having a size of N×1 as an OFDM symbol in the time domain that does not include a UW, $F_N^{-1}$ denotes an N-point inverse discrete Fourier transform (IDFT) matrix, B denotes a matrix having a size of N×($N_d$+$N_r$) in which each element is 0 or, 1 as a zero padding matrix, A denotes a matrix having a size of ($N_d$+$N_r$)×($N_d$+$N_r$), as a spreading matrix, P denotes a matrix having a size of ($N_d$+$N_r$)×($N_d$+$N_r$) in which each element is 0 or 1, as a permutation matrix, denotes a matrix having a size of $N_d$×1, as data values of the frequency domain included in the OFDM symbol, $\tilde{r}$ denotes a matrix having a size of $N_r$×1, as redundant subcarriers in the frequency domain, $x_d$ denotes a matrix having a size of (N–$N_u$)×1 as payload data, and $0_{N_u \times 1}$ denotes a zero matrix having a size of $N_u$×1.

A redundant subcarrier for forming a zero UW in a specific area as in Equation 1 may be generated as shown in Equation 2.

$$\begin{bmatrix} M_{11} & M_{12} \\ M_{21} & M_{22} \end{bmatrix} \begin{bmatrix} \tilde{d} \\ \tilde{r} \end{bmatrix} = \begin{bmatrix} x_d \\ 0 \end{bmatrix} \text{ with } M = F_N^{-1} BAP = \begin{bmatrix} M_{11} & M_{12} \\ M_{21} & M_{22} \end{bmatrix} \quad \text{Equation 2}$$

$$M_{21}\tilde{d} + M_{22}\tilde{r} = 0$$

$$\tilde{r} = T\tilde{d} \text{ with } T = -M_{22}^{-1} M_{21} \in \mathbb{C}^{N_r \times N_d}$$

In Equation 2, $M_{mn}$ denotes a partial matrix of a matrix M, $\tilde{d}$ denotes data values in the frequency domain included in an OFDM symbol, $\tilde{r}$ denotes redundant subcarriers in the frequency domain, $x_d$ denotes payload data, $F_N^{-1}$ denotes an N-point IDFT matrix, B denotes a zero padding matrix, A denotes a spreading matrix, P denotes a permutation matrix, and T denotes a redundant generation matrix.

Figure 26:
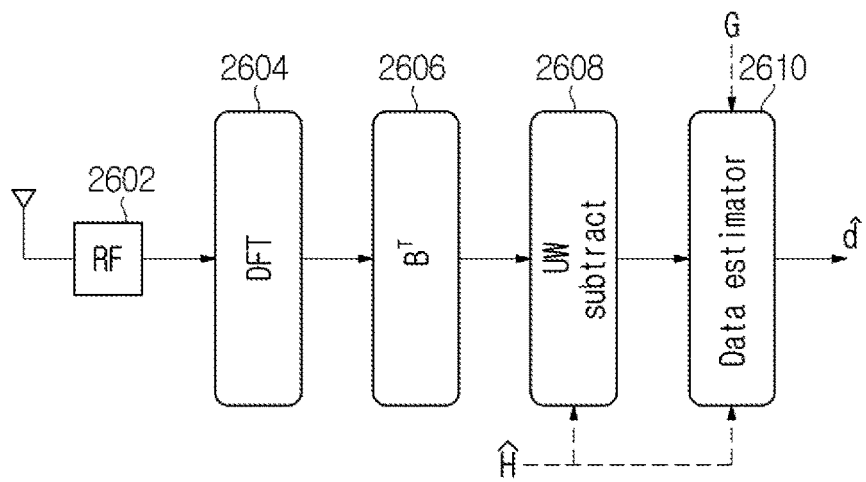
FIG. 26 is a diagram illustrating an example of a receiver for processing a UW-OFDM symbol applicable to the present disclosure.

FIG. 26 is a diagram illustrating an example of a receiver for processing a UW-OFDM symbol applicable to the present disclosure. The components illustrated in FIG. 26 are functional blocks, and the components may be physically implemented as one or more circuits.

Referring to FIG. 26, the receiver includes a radio frequency (RF) reception unit 2602, a DFT unit 2604, a zero remover 2606, a UW subtracting unit 2608 and a data estimator 2610.

The RF reception unit 2602 includes at least one antenna and processes an RF signal received through the at least one antenna. For example, the RF reception unit 2602 may perform filtering, amplification, frequency conversion, and analog-to-digital conversion on the received signal. To this end, the RF reception unit 2602 may include at least one RF chain including at least one of a filter, an amplifier, a mixer, or an analog-to-digital converter (ADC). Here, the received signal includes at least one UW-OFDM symbol.

The DFT unit 2604 transforms the UW-OFDM symbol into a frequency domain signal by performing a DFT operation on the UW-OFDM symbol. According to another embodiment, the DFT operation may be replaced with a FFT operation.

The UW subtracting unit 2608 subtracts a UW from the signal output from the DFT unit 2604. To this end, the UW subtracting unit 2608 subtracts the UW value in the frequency domain from the input signal. In this case, the subtracted UW value includes a value modified in consideration of channel information (e.g., a channel matrix $\hat{H}$).

The data estimator 2610 detects data from the signal from which the UW is removed. In this case, the data estimator 2610 may restore data by equalizing a data signal based on information (e.g., code generation matrix G) on the redundant subcarriers, permutation and spreading used in the transmitter and channel information (e.g., channel matrix $\hat{H}$) and then performing data estimation.

Hereinafter, the present disclosure will describe embodiments in which a UW length and arrangement method may be adaptively changed in a UW-OFDM system. Through embodiments to be described later, a UW-OFDM symbol having a structure suitable for a situation and purpose may be supported. In addition, embodiments of control information and signaling for receiving an adaptively changed UW structure without performance reduction in a receiver will be described.

In the UW-OFDM system, a UW may be used for various purposes. For example, the UW may be used for synchronization acquisition, channel estimation, phase noise estimation, and the like. Accordingly, it may be necessary to adaptively adjust the structure or configuration for the UW according to a change in the communication environment or required performance. An embodiment of adaptively adjusting the UW is shown in FIG. 27 below.

Figure 27:
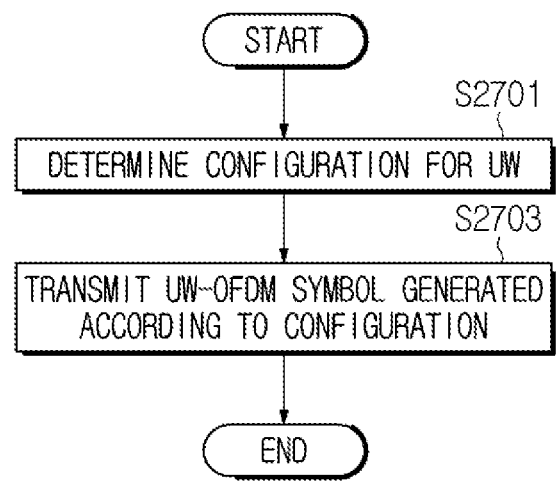
FIG. 27 is a diagram illustrating an embodiment of a procedure for adaptively adjusting a UW of a UW-OFDM symbol in an apparatus applicable to the present disclosure.

FIG. 27 is a diagram illustrating an embodiment of a procedure for adaptively adjusting a UW of a UW-OFDM symbol in an device applicable to the present disclosure. FIG. 27 illustrates an operation method of an device for transmitting a UW-OFDM symbol. The operation subject of the procedure shown in FIG. 27 may be a base station or a terminal.

Referring to FIG. 27, in step S2701, the device determines a configuration for the UW. The configuration for the UW is related to how the UW is arranged within the UW-OFDM symbol. For example, the configuration for the UW may include at least one of a length of the UW, a position of the UW, the number of UWs, and a value of a sequence included in the UW. To determine the configuration for the UW, the device may determine at least one parameter related to the configuration for the UW based on the communication environment or required performance, or may receive information on the configuration for the UW from another device.

In step S2703, the device transmits the generated UW-OFDM symbol according to the configuration. The device generates a UW-OFDM symbol including a UW according to the determined configuration for the UW, and transmits the generated UW-OFDM symbol. Specifically, the device determines a generation matrix (e.g., a code generation matrix G) for forming a zero UW based on the determined configuration for the UW, and performs at least one of redundant subcarrier generation, permutation or spreading using the determined generation matrix to form at least one zero UW according to the configuration for the UW. Then, after inserting at least one UW to be transmitted into the at least one zero UW, the device transmits a UW-OFDM symbol including the at least one UW.

According to the embodiment described with reference to FIG. 27, adaptive UW adjustment may be supported. In this case, various factors may be considered as a criterion for adjusting the UW. Examples of some factors for adjusting the configuration for the UW will be described below. Factors for adjusting the configuration for the UW, which will be described later, are not mutually exclusive, and according to some embodiments, a plurality of factors may be simultaneously applied.

According to an embodiment, the length of the UW may be adjusted according to the channel environment. As obstacles around a transmission device and a reception device are added or removed, the radio channel environment may change. In the case of an environment with many obstacles, a channel environment with many multipaths is formed, and, in this case, delay spread may increase. Similar to CP of CP-OFDM, the UW may be used for the purpose of preventing inter symbol interference (ISI). In this case, since a specific area within the OFDM symbol duration is used as the UW, if the UW becomes longer, bandwidth efficiency of the UW-OFDM system is reduced. Therefore, since it is inefficient to always use a long UW for ISI prevention, it is necessary to adaptively adjust the UW length according to the channel environment.

Figure 28:
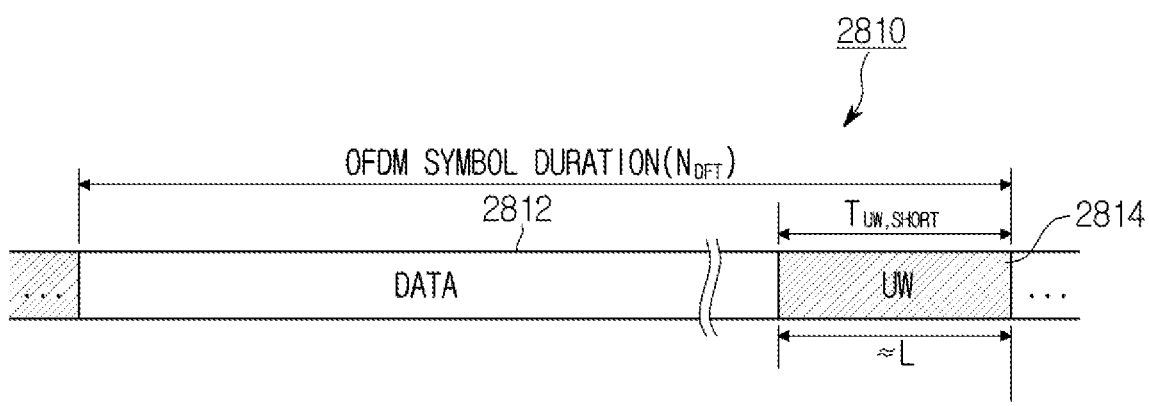
FIG. 28 is a diagram illustrating examples in which a length of a UW is adjusted in a UW-OFDM symbol applicable to the present disclosure.

FIG. 28 is a diagram illustrating examples in which a length of a UW is adjusted in a UW-OFDM symbol applicable to the present disclosure. Referring to FIG. 28, a UW-OFDM symbol 2810 includes data 2812 and a UW 2814. When delay spread by L occurs according to channel conditions, a UW 2814 having a length of $T_{UW,short}$, which is similar to L, may be used in order to reduce the effect of delay spread. In other words, the length of the UW 2814 may be adjusted based on the magnitude of delay spread. Due to this, it is possible to cope with ISI while minimizing overhead due to UW transmission.

Figure 29:
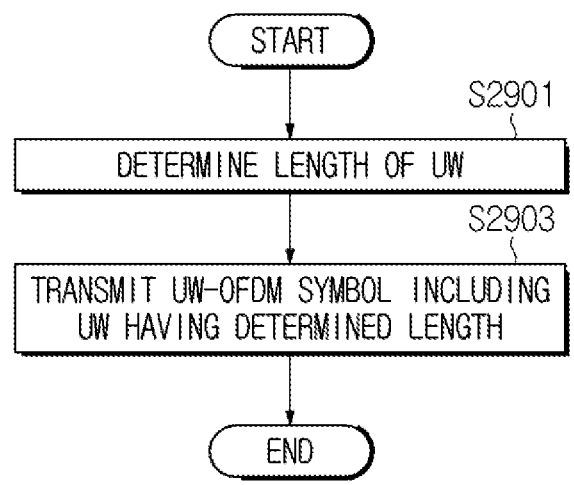
FIG. 29 is a diagram illustrating an embodiment of a procedure for adaptively adjusting a length of a UW of a UW-OFDM symbol in an apparatus applicable to the present disclosure.

FIG. 29 is a diagram illustrating an embodiment of a procedure for adaptively adjusting a length of a UW of a UW-OFDM symbol in an device applicable to the present disclosure. FIG. 29 illustrates an operation method of an device for transmitting a UW-OFDM symbol. An operation subject of the procedure shown in FIG. 29 may be a base station or a terminal.

Referring to FIG. 29, in step S2901, the device determines the length of the UW. To determine the length of the UW, the device may determine the length of the UW based on the communication environment or required performance, or may receive information on the length of the UW from another device. For example, the device may measure the delay spread of the channel, determine the length of the UW based on the measured delay spread, or report the measured delay spread to another device.

In step S2903, the device transmits a UW-OFDM symbol including the UW having the determined length. The device generates a UW-OFDM symbol including the UW having the determined length, and transmits the generated UW-OFDM symbol. Specifically, the device determines a generation matrix (e.g., code generation matrix G) for forming a zero UW having the determined length, and performs at least one of redundant subcarrier generation, permutation or spreading using the determined generation matrix to form one zero UW. Then, the device inserts at least one UW having the determined length into the at least one zero UW and then transmits a UW-OFDM symbol including the at least one UW.

Figure 30:
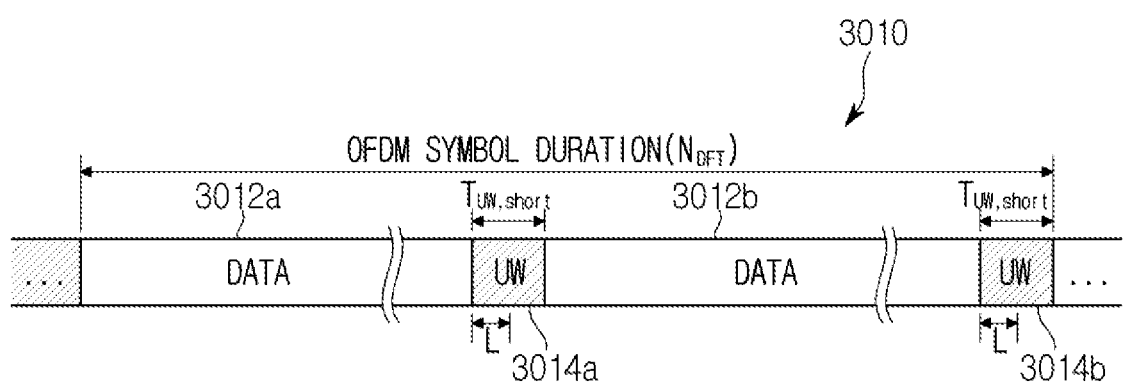
FIG. 30 is a diagram illustrating examples in which two UWs are used in a UW-OFDM symbol applicable to the present disclosure.
Figure 31:
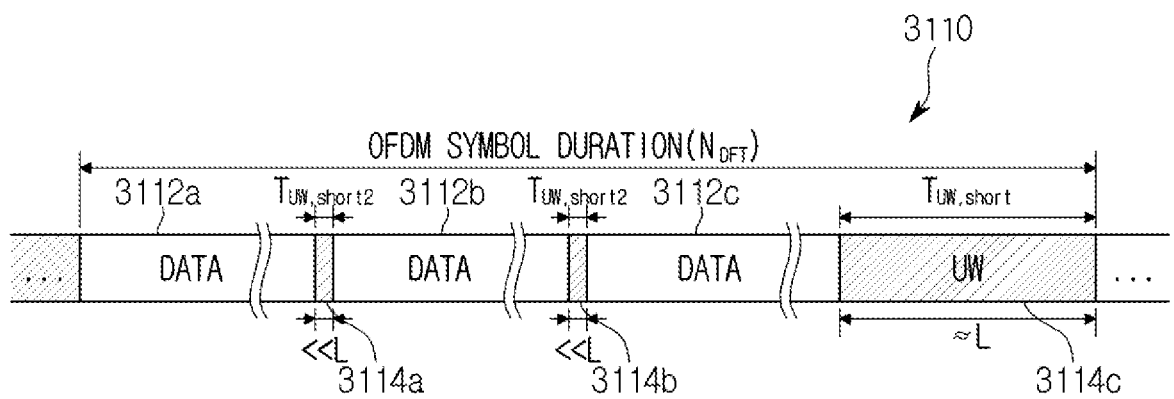
FIG. 31 is a diagram illustrating examples in which three UWs are used in a UW-OFDM symbol applicable to the present disclosure.

According to an embodiment, the number of UWs may be adjusted according to the channel environment. In a high-frequency wireless channel environment, reception performance in an environment with low channel quality (e.g., signal to noise ratio (SNR)) is greatly affected by noise, and reception performance in an environment with high channel quality is relatively greatly affected by phase noise. In the case of an environment with high channel quality, since the power of a signal is large compared to noise, a modulation technique having a high modulation order may be used. In this case, in order to estimate dominant phase noise, it is possible to insert several UWs into a UW-OFDM symbol duration. If a UW for estimating phase noise is further inserted into the UW for preventing ISI, the number of data subcarriers that may be transmitted in the OFDM symbol duration is reduced. Therefore, by adaptively adding more UWs in consideration of the channel condition and the modulation order used, it is possible to overcome the phase noise while minimizing overhead due to UW transmission. FIGS. 30 and 31 show a symbol structure that is easy to estimate phase noise.

FIG. 30 is a diagram illustrating examples in which two UWs are used in a UW-OFDM symbol applicable to the present disclosure. Referring to FIG. 30, within the entire symbol duration of the UW-OFDM symbol 3010, first data 3012a, a first UW 3014a, second data 3012b and a second UW 3014b are arranged. Here, the lengths of the first UW 3014a and the second UW 3014b are $T_{UW,short}$. The structure illustrated in FIG. 30 may be applied in an environment in which the delay spread of a channel is relatively small and phase noise is large. The length $T_{UW,short}$ of the UW is preferably set larger than the magnitude L of delay spread, and the two UWs 3014a and 3014b may be used to estimate phase noise.

FIG. 31 is a diagram illustrating examples in which three UWs are used in a UW-OFDM symbol applicable to the present disclosure. Referring to FIG. 31, within the entire symbol duration of the UW-OFDM symbol 3110, first data 3112a, a first UW 3114a, second data 3112b, a second UW 3114b, third data 3112c and a third UW 3114c are arranged. The lengths of the first UW 3114a and the second UW 1014b is $T_{UW,short2}$, and the length of the third UW 3114c is $T_{UW,short}$. In the example of FIG. 31, spacings between the three UWs 3114a, 3114b, and 3114c may be the same. The structure illustrated in FIG. 31 may be applied in an environment where both delay spread and phase noise are large. The third UW 3114c present at the boundary of the symbol is used for the purpose of preventing ISI, and the length $T_{UW,short}$ may be set to a value similar to the delay spread. The lengths of the UWs 3114a and 3114b present in the middle of the symbol are $T_{UW,short2}$, which is smaller than $T_{UW,short}$. By using $T_{UW,short2}$ smaller than the delay spread, resources consumed for UW transmission may be minimized.

Figure 32:
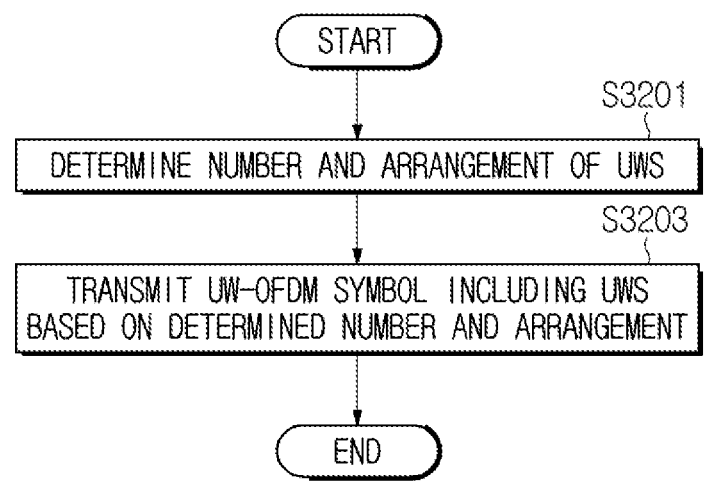
FIG. 32 is a diagram illustrating an embodiment of a procedure for adaptively adjusting the number of UWs of a UW-OFDM symbol in an apparatus applicable to the present disclosure.

FIG. 32 is a diagram illustrating an embodiment of a procedure for adaptively adjusting the number of UWs of a UW-OFDM symbol in an device applicable to the present disclosure. FIG. 32 illustrates an operation method of an device for transmitting a UW-OFDM symbol. An operation subject of the procedure shown in FIG. 32 may be a base station or a terminal.

Referring to FIG. 32, in step S3201, the device determines the number and arrangement of UWs. To determine the number and arrangement of UWs, the device may determine the number and arrangement of UWs based on a communication environment or required performance, or may receive information on the number and arrangement of UWs from another device. For example, the device may measure the quality and delay spread of the channel, determine the number and arrangement of UWs based on the measured quality and delay spread, or report the measured quality and delay spread to another device. For example, the number of UWs may be 2 as shown in FIG. 30, 3 as shown in FIG. 31, or 4 or more. Here, the determination of the arrangement of UWs may be included in the determination of the number of UWs.

In step S3203, the device transmits a UW-OFDM symbol including UWs based on the determined number and arrangement. The device generates a UW-OFDM symbol including the UWs based on the determined number and arrangement, and transmits the generated UW-OFDM symbol. Specifically, the device determines a generation matrix (e.g., a code generation matrix G) for forming at least one zero UW based on the determined number and arrangement, and performs at least one of redundant subcarrier generation, permutation or spreading using the determined generation matrix to form at least one zero UW. Then, the device inserts the at least one UW to be transmitted into the at least one zero UW and then transmits a UW-OFDM symbol including the at least one UW.

In the embodiment described with reference to FIG. 32, the device determines the number and arrangement of UWs. Additionally, the device may determine the length of the at least one UW. In this case, when a plurality of UWs are used, the lengths of the UWs may be different from each other. According to an embodiment, the length of the UW may depend on the number of UWs. For example, according to the number of UWs, the total length of the UWs may be limited. For example, the UW length may be determined to be a value obtained by dividing the sum of lengths corresponding to the number of UWs by the number of UWs. In this case, the determination of the UW length may be included in the determination of the number of UWs. However, according to an embodiment, the length of a UW located at a symbol boundary for ISI reduction among UWs may be independently determined irrespective of a UW inserted in the middle of the symbol duration.

According to an embodiment, the configuration for the UW may be adjusted by multiplexing a plurality of services. In the following description, URLLC and eMBB are exemplified as a plurality of services, but a plurality of distinguishable different services may be applied to an embodiment to be described later.

URLLC uses a relatively short transmission time interval (TTI) to minimize data latency. To this end, a NR system introduced various numerology, and supports a structure with a short OFDM symbol interval for URLLC. In addition, in general, a slot composed of 14 OFDM symbols is used in a basic scheduling unit, whereas the NR system introduced a mini slot composed of 2 to 4 OFDM symbols for URLLC. In the NR system, if two different numerology services are provided, additional latency may occur because scheduling units are different from each other. While using numerology in a long scheduling unit, it is necessary to switch to numerology in a short scheduling unit for URLLC transmission. In this case, latency may occur until the numerology in the long scheduling units ends.

In the case of UW-OFDM, data having a short scheduling unit may be transmitted in a time division multiplexing (TDM) scheme within an OFDM symbol duration. For example, FIG. 33 shows a situation in which a plurality of services are transmitted in a TDM manner.

Figure 33:
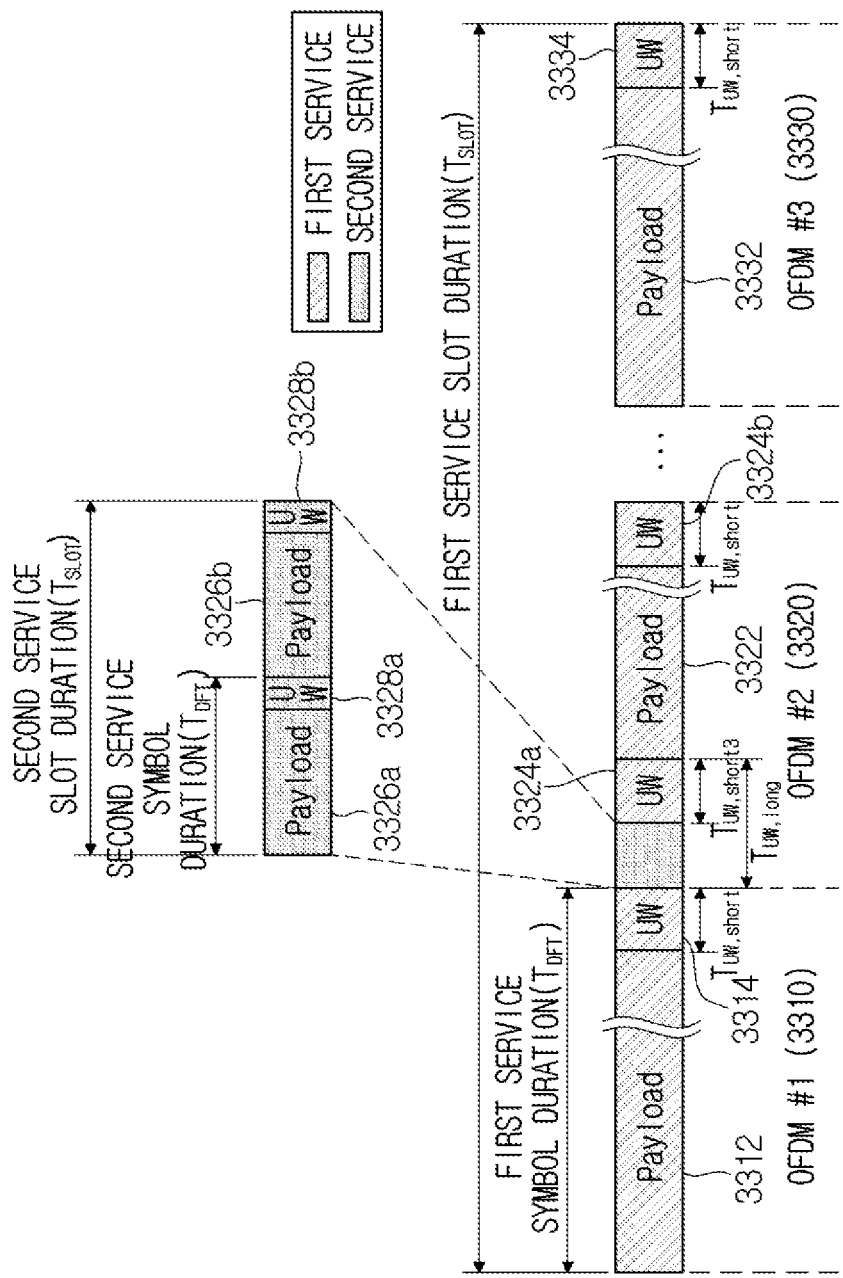
FIG. 33 is a diagram illustrating an example in which a plurality of services are multiplexed in a UW-OFDM symbol applicable to the present disclosure.

FIG. 33 is a diagram illustrating an example in which a plurality of services are multiplexed in a UW-OFDM symbol applicable to the present disclosure. FIG. 33 illustrates multiplexing of a first service (e.g., eMBB) having a small latency constraint and a second service (e.g., URLLC) having a relatively large delay constraint. Referring to FIG. 33, the slot of the first service includes 14 symbols, and the slot of the second service includes 2 symbols. Of the 14 symbols, FIG. 33 shows OFDM symbol #0 3310, OFDM symbol #1 3320 and OFDM symbol #13 3330.

In the symbol duration of OFDM symbol #0 3310 and OFDM symbol #13 3330, the second service is not multiplexed. Accordingly, OFDM symbol #0 3310 includes a payload 3312 and a UW 3314 for the first service, and OFDM symbol #13 3330 includes a payload 3332 and a UW 3334 for the first service. Since the second data is not multiplexed, the length of the UW 3314 or 3334 included in OFDM symbol #0 3310 and OFDM symbol #13 3330 is $T_{UW,short}$ determined based on the delay spread of the corresponding channel.

Within the symbol duration of OFDM symbol #1 3320, the second service is multiplexed with the first service. When the second service with the relatively large delay constraint is to be provided within a symbol duration of OFDM symbol #1 3320 while transmitting the first service, the transmission device may form a resource duration to be allocated for the second service as a zero UW and then transmit a signal for the second service using the duration of the formed zero UW. Referring to FIG. 33, OFDM symbol #1 3320 includes a payload 3322 and UWs 3324a and 3324b for the first service, and includes payloads 3326a and 3326b and UWs 3328a and 3328b for the second service. Here, in order to ensure cyclicity of the second service data, the sequence of UWs 3328a and 3328b included in the second service symbol preferably includes a part of the sequence included in the UW 3312, 3324a, 3324b or 3334 for the first service.

From the point of view of the signal for the first service, a second service slot duration may be understood as at least a part of the zero UW. In other words, in order to secure resources for the payloads 3326a and 3326b and the UWs 3328a and 3328b for the second service, the transmission device may form a zero UW including the corresponding duration. For a resource occupied by a second service slot duration, a zero UW having a length of $T_{UW,long}$ is additionally formed, and data of the second service is multiplexed in the corresponding duration. In the example of FIG. 33, for the insertion of the UW 3324a for the first service, $T_{UW,long}$ is greater than the length of the second service slot duration. In this case, the UW 3324a having length of $T_{UW,long}$ may be used to determine whether the second service is multiplexed in the corresponding symbol. The UW 3324a having a length of $T_{UW,short3}$ includes at least a part of a sequence of the UW 3314, 3324b or 3334 having a length of $T_{UW,short}$ used in each symbol for general ISI prevention. Accordingly, a reception device (e.g., terminal) performs an auto-correlation operation of two UW durations that may be arranged at a point where the second service may be transmitted, thereby determining whether data of the second service is present in the OFDM symbol. By multiplexing using the above-described zero UW, TTI can be further minimized, and scheduling flexibility can be secured.

Figure 34:
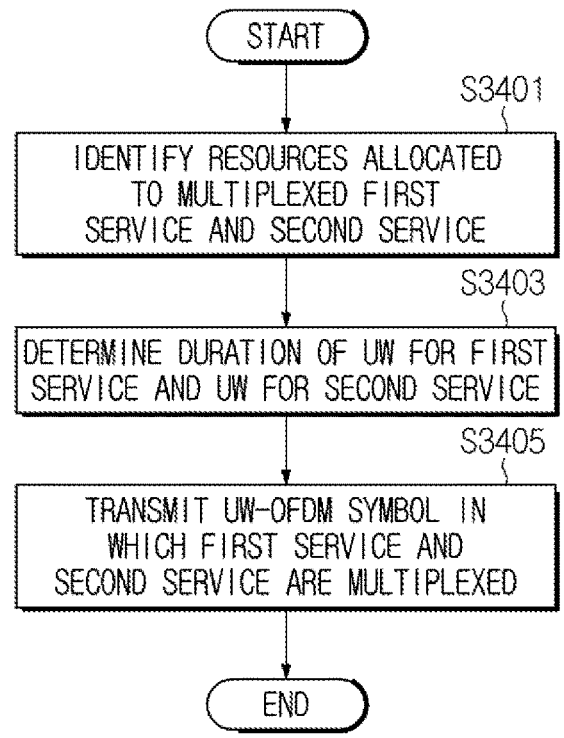
FIG. 34 is a diagram illustrating an embodiment of a procedure for transmitting a UW-OFDM symbol in which a plurality of services is multiplexed in an apparatus applicable to the present disclosure.

FIG. 34 is a diagram illustrating an embodiment of a procedure for transmitting a UW-OFDM symbol in which a plurality of services is multiplexed in an device applicable to the present disclosure. FIG. 34 illustrates an operation method of an device for transmitting a UW-OFDM symbol. An operation subject of the procedure shown in FIG. 34 may be a base station or a terminal.

Referring to FIG. 34, in step S3401, the device identifies resources allocated to the multiplexed first service and second service. The device identifies in which duration the second service slot is arranged within the OFDM symbol duration used for the first service. In this case, the multiplexing of the first service and the second service may be confirmed before or after the resources for the first service are allocated. If multiplexing is confirmed after allocation, some of the resources already allocated for the first service may be punctured for the resources for the second service.

In step S3403, the device determines the duration of the UW for the first service and the UW for the second service. Here, the duration of the UW for the first service includes a resource duration for the second service. That is, the resource duration for the second service may be understood as a zero UW from the standpoint of the signal for the first service.

In step S3405, the device transmits a UW-OFDM symbol in which the first service and the second service are multiplexed. To this end, the device generates an OFDM symbol including a zero UW using a second matrix different from a generation matrix (e.g., a first generation matrix) used when the second service is not multiplexed, and then inserts a plurality of UWs. Here, when the signal of the first service and the signal of the second service are generated using separate generation matrices, a second generation matrix may be defined to form at least one zero UW in the duration of at least one UW for the first service and the duration of the signal of the second service. When the signal of the first service and the signal of the second service are generated using one generation matrix, the second generation matrix may be defined to form zero UWs in durations occupied by the UWs.

In the embodiment described with reference to FIG. 34, as the second service is multiplexed, the duration of the UW for the first service may vary. According to an embodiment, the duration of the UW for the first service may include resources adjacent or contiguous to the resource duration for the second service. That is, as the second service is multiplexed, a plurality of UEs including a UW (e.g., UW 3324a) adjacent to a second service slot duration may be used for the first service.

According to another embodiment, if there are other means capable of detecting multiplexing of the second service, the UW adjacent to the second service slot duration may be omitted. For example, as another means, an indication indicating multiplexing of the second service may be transmitted. The indication may be transmitted through control information included in a slot in which the second service is multiplexed or through control information of a next slot. The indication may indicate whether multiplexing is performed, and may further indicate a symbol in which the second service is multiplexed. When transmitted through the control information of the next slot, the reception device may process OFDM symbols in a (n−1)-th slot after checking whether the second service is multiplexed through the control information of a n-th slot.

In the embodiment described with reference to FIG. 34, when the second service is multiplexed, a second generation matrix is used. If a position occupied by the slot of the second service within one UW-OFDM symbol may vary according to circumstances, as many generation matrices as the number of selectable candidate positions may be defined. In this case, the device selects a generation matrix corresponding to the position of the slot of the second service, and generates a UW-OFDM symbol using the selected generation matrix.

As described above, the length, number, position, etc. of the UW may be adaptively adjusted based on the channel environment, multiplexing of services, and the like. In addition to the length, number, and position described above, various other factors, for example, a sequence of UWs, an interval between UWs, etc. may be generally or additionally further adjusted.

Hereinafter, the present disclosure describes control signaling necessary to support adaptive adjustment of the configuration for the UW as described above. Since the configuration for UW is related to a physical signal, it shall be shared between an device that transmits a signal and an device that receives it. Accordingly, when the configuration for the UW is adaptively adjusted, it is required that the configuration for the UW after adjustment is transmitted from one side (e.g., a base station) to the other side (e.g., a terminal).

Since control signaling is for devices performing communication to smoothly generate and interpret a UW-OFDM symbol, a transmitter structure needs to be considered. Referring to FIG. 25, data $\tilde{d}$ to be transmitted may be understood as a signal precoded by a code generation matrix G determined by a redundant generation matrix T, a permutation matrix P, and a spreading matrix A for generating a redundant subcarrier. When a guard band is inserted by a zero padding matrix B and an IDFT operation is performed, the signal is composed of a zero UW portion in which a specific duration becomes 0 and a payload portion including data. Thereafter, when a UW sequence is inserted in the time domain, a final UW-OFDM symbol is generated. In this case, a structure in which spreading is not performed may be referred to as non-systematic coded UW-OFDM, and a structure in which spreading is performed may be referred to as systematic coded UW-OFDM. The time domain symbol of UW-OFDM may be expressed as Equation 3 below.

$$x' = F_N^{-1} BAP \begin{bmatrix} \tilde{d} \\ \tilde{r} \end{bmatrix} = F_N^{-1} BAP \begin{bmatrix} I \\ T \end{bmatrix} \tilde{d} = F_N^{-1} BG\tilde{d} = \begin{bmatrix} x_d \\ 0 \end{bmatrix} \quad \text{Equation 3}$$

In Equation 3, x' denotes an OFDM symbol in the time domain in which a UW is not included, $F_N^{-1}$ denotes an N-point IDFT matrix, B denotes a zero padding matrix, A denotes a spreading matrix, P denotes a permutation matrix, $\tilde{d}$ denotes data values in the frequency domain included in the OFDM symbol, $\tilde{r}$ denotes redundant subcarriers in the frequency domain, I denotes a unit matrix, T denotes a redundant generation matrix, G denotes a code generation matrix, and $x_d$ denotes payload data.

The redundant generation matrix T is determined by the permutation matrix P and the spreading matrix A. The permutation matrix P is determined based on the position and length of the UW so that the power of the redundancy is minimized. The spreading matrix A is determined through an optimization method. In this case, a cost function that may be used may be set to minimize error covariance in the reception device. In this case, the optimal value of the cost function may vary depending on the structure of the receiver (e.g., best linear unbiased estimator (BLUE), minimum mean square error (MMSE), etc.).

If the receiver uses information on the code generation matrix G used in the transmitter, the receiver does not lose the power used to transmit the redundancy, and may use it for data estimation. Information on the code generation matrix may be transmitted in various formats.

For example, in the case of a systematic coded UW-OFDM system, if the position and length of the UW in the OFDM symbol duration are known, the reception device may derive the code generation matrix G. When information on candidates of the position and length of an available UW is predefined, if the transmission device provides identification information of a candidate to be used, the reception device may know the position and length of the used UW using the identification information. That is, if the position and length of the UW are shared in advance in the form of a table and an index indicating a combination of the position and length to be used in a corresponding scheduling unit (e.g., TTI) is transmitted, adaptive UW transmission and reception between devicees is possible and, at the same time, signaling overhead can be reduced.

For example, in the case of a non-systematic coded UW-OFDM system, the code generation matrix G may vary according to a method of optimizing the spreading matrix A. Therefore, if code generation matrices according to the arrangement of various zero UWs are predefined and information (e.g., a codebook) constructed to indicate code generation matrices according to a certain format is shared between devicees, by transmitting information (e.g., codebook index) indicating a code generation matrix to be used in the corresponding scheduling unit from one side to the other, it is possible to enable transmission and reception of the adaptive UW and to reduce signaling overhead. Information constructed to indicate code generation matrices may also be used in the systematic coded UW-OFDM system.

Figure 35:
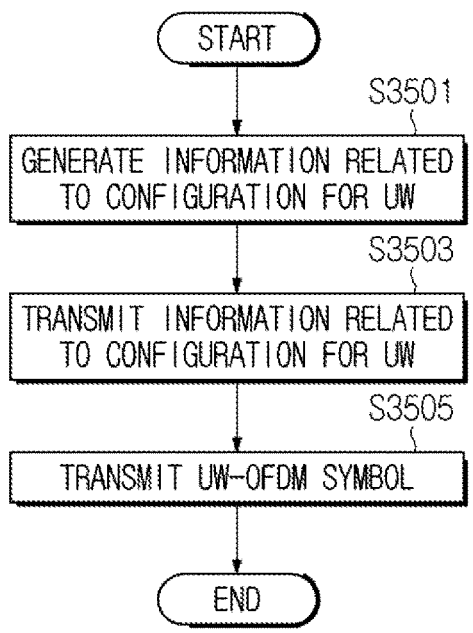
FIG. 35 is a diagram illustrating an embodiment of a procedure for providing information on a configuration for a UW in an apparatus applicable to the present disclosure.

FIG. 35 is a diagram illustrating an embodiment of a procedure for providing information on a configuration for a UW in an device applicable to the present disclosure. FIG. 35 illustrates an operation method of an device for transmitting a UW-OFDM symbol. An operation subject of the procedure shown in FIG. 35 may be a base station or a terminal.

Referring to FIG. 35, in step S3501, the device generates information related to the configuration for the UW. The device determines the configuration for the UW based on the channel environment, multiplexing of services, and the like, and generates information related to the determined configuration for the UW. The information related to the configuration for the UW is information used to generate and interpret the UW-OFDM symbol, and is information indicating the structure in at least one UW within the UW-OFDM symbol. For example, the information related to the configuration for the UW may include information related to a generation matrix used to generate a zero UW-OFDM symbol. For example, the information related to the configuration for the UW may include at least one of information indicating the generation matrix, information indicating at least one variable necessary to derive the structure of the generation matrix, and information indicating the possibility of adjusting the generation matrix.

In step S3503, the device transmits information related to the configuration for the UW. The information related to the configuration for the UW may be transmitted through one message. For example, the device may transmit information necessary to determine generation matrices to be used during a corresponding interval through control signaling that occurs periodically. Alternatively, the information related to the configuration for the UW may be hierarchically transmitted through a plurality of messages. For example, the device may transmit information related to candidates of a selectable generation matrix through effective control signaling in a relatively long term, and transmit information indicating one of the candidates through effective control signaling in a relatively short term.

In step S3505, the device transmits a UW-OFDM symbol. The device may generate a UW-OFDM symbol according to the information on the configuration for the transmitted UW, and transmit the generated UW-OFDM symbol. That is, the device may apply the configuration for the corresponding UW to the UW-OFDM symbol transmitted within the same TTI as the information on the configuration for the UW. According to another embodiment, there may be a temporal margin between a time point at which the information on the configuration for the UW is transmitted and a time point at which the configuration for the corresponding UW is applied. Here, the margin may be predefined as a predetermined value, or may be explicitly or implicitly indicated by the information on the configuration for the UW.

In the embodiment described with reference to FIG. 35, the device transmits the information on the configuration for the UW and transmits a UW-OFDM symbol according to the configuration for the UW. This may be understood as a procedure in which the base station transmits a downlink signal to the terminal. Although not shown in FIG. 35, the device may transmit the information on the configuration for the UW and receive the generated UW-OFDM symbol according to the configuration for the UW. This may be understood as a procedure in which the base station receives an uplink signal from the terminal.

Figure 36:
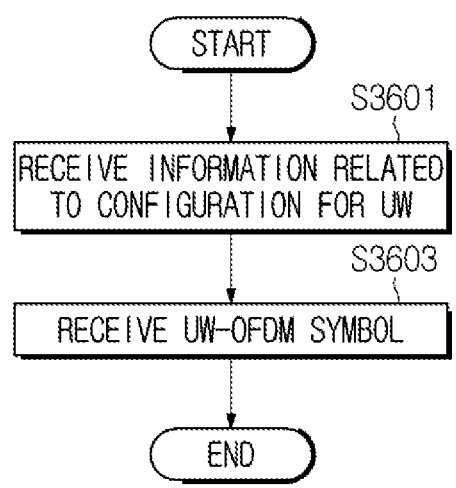
FIG. 36 is a diagram illustrating an embodiment of a procedure for obtaining information on a configuration for a UW in an apparatus applicable to the present disclosure.

FIG. 36 is a diagram illustrating an embodiment of a procedure for obtaining information on a configuration for a UW in an device applicable to the present disclosure. FIG. 36 illustrates an operation method of an device for receiving a UW-OFDM symbol. An operation subject of the procedure shown in FIG. 36 may be a base station or a terminal.

Referring to FIG. 36, in step S3601, the device receives information related to the configuration for the UW. For example, the information related to the configuration for the UW may include information related to a generation matrix used to generate a zero UW-OFDM symbol. For example, the information related to the configuration for the UW may include at least one of information indicating the generation matrix, information indicating at least one variable necessary to derive the structure of the generation matrix, or information indicating the possibility of adjusting the generation matrix. In addition, the information related to the configuration for the UW may further include information related to multiplexing of a plurality of services. For example, information related to the configuration for the UW may be received through one message or may be received through a plurality of messages.

In step S3603, the device receives a UW-OFDM symbol. The device may process the received UW-OFDM symbol according to the information on the configuration for the received UW. For example, the device may check an interval occupied by at least one UW according to the information on the configuration for the received UW, and remove the at least one UW from the UW-OFDM symbol. In this case, the device may apply the configuration for the corresponding UW to information on the UW-OFDM symbol received within the same TTI as the information on the configuration for the UW. According to another embodiment, the device may receive the information on the configuration for the UW and then apply the configuration for the UW to the UW-OFDM symbol received after a certain margin has elapsed. Here, the margin may be predefined as a predetermined value, or may be explicitly or implicitly indicated by the information on the configuration for the UW.

In the embodiment described with reference to FIG. 36, the device receives information on the configuration for the UW and receives a UW-OFDM symbol generated according to the configuration for the UW. This may be understood as a procedure in which the terminal transmits an uplink signal to the base station. Although not shown in FIG. 36, the device may receive the information on the configuration for the UW and transmit the generated UW-OFDM symbol according to the information on the configuration for the UW. This may be understood as a procedure in which the terminal transmits an uplink signal to the base station.

As in the embodiments described with reference to FIGS. 35 and 36, the information on the configuration for the UW is transmitted prior to transmission and reception of the UW-OFDM symbol. The information on the configuration for the UW is information used to determine the code generation matrix. Factors affecting the code generation matrix are shown in Table 6 below.

TABLE 6

| Factor | Description |
| --- | --- |
| Total number of subcarriers | It means the total number of available subcarriers in bandwidth. It is the same as the size of the IDFT and is determined by the allocated bandwidth and subcarrier spacing. |
| Number of zero subcarriers | It means the number of zero subcarriers in bandwidth. It may be used for DC or guard band. |
| Number of redundant subcarriers | It means the number of redundant subcarriers in bandwidth. It may be set to a value equal to the length of the UW in the time domain. |
| Zero UW arrangement method | For general ISI prevention, a zero UW is arranged at the end of the OFDM symbol. When phase noise is severe, a zero UW may be additionally arranged in the middle part of the OFDM symbol. As such, when the length of UW as well as the arrangement method is changed, a redundant generation matrix T is changed, and as a result, the code generation matrix G may also be changed. |
| Method of optimizing code generation matrix | In the case of non-systematic coded UW-OFDM, the code generation matrix may be optimized so that the power of the redundant part is minimized. In the case of systematic coded UW-OFDM, the code generation matrix may be optimized to minimize reception error covariance. As such, the code generation matrix may vary depending on the cost function to be optimized. |

In consideration of factors such as Table 6, the control information related to the configuration for the UW transmitted between devicees may include at least one of the items listed in Table 7 below.

TABLE 7

| Item | Description |
| --- | --- |
| Codebook index #1 | Codebook index applied to OFDM symbols in the corresponding scheduling unit when other services (e.g., URLLC) are not multiplexed |
| Codebook index #2 | Codebook index applied to OFDM symbols multiplexed with other services (e.g., URLLC) |
| Discontinuous UW interval | Interval between UWs when using multiple UWs in the OFDM symbol (e.g., 0, (1/2) * TDFT, (1/4) * TDFT, (1/8) * TDFT, etc.) |
| Variable UW enable flag | Indicator indicating whether the length of the UW may be changed within a scheduling unit. |
| TUW, short | Length of one UW interval when other services are not multiplexed |
| TUW, long | Length of the zero UW interval when other services are multiplexed |

The names of the items listed in Table 7 are exemplary, and each item may be referred to as another name having an equivalent technical meaning. In addition to the items listed in Table 7, information indicating the sequence of the UW, information indicating the code generation matrix itself, etc. may be included alternatively or additionally.

In Table 7, the codebook, which is the basis of the codebook index, may be composed of a code generation matrix or parameters necessary for generation of the code generation matrix. In the case of non-systematic UW-OFDM, the codebook may be composed of code generation matrices according to the arrangement of the zero UW. In the case of systematic UW-OFDM, the codebook may be composed of a combination of the length and position information of the UW. In this way, if the codebook index is transmitted after sharing information in the form of a codebook, signaling overhead can be minimized.

At least some of the items that may be included in the aforementioned control information may be semi-statically managed through system information. For example, length information of $T_{UW,short2}$ may be semi-statically used through system information.

The minimum unit for adaptively adjusting the UW may be a scheduling unit (e.g., TTI). That is, in a region in which control information is transmitted in scheduling units, control information necessary for adaptive UW change may be transmitted.

Figure 37:
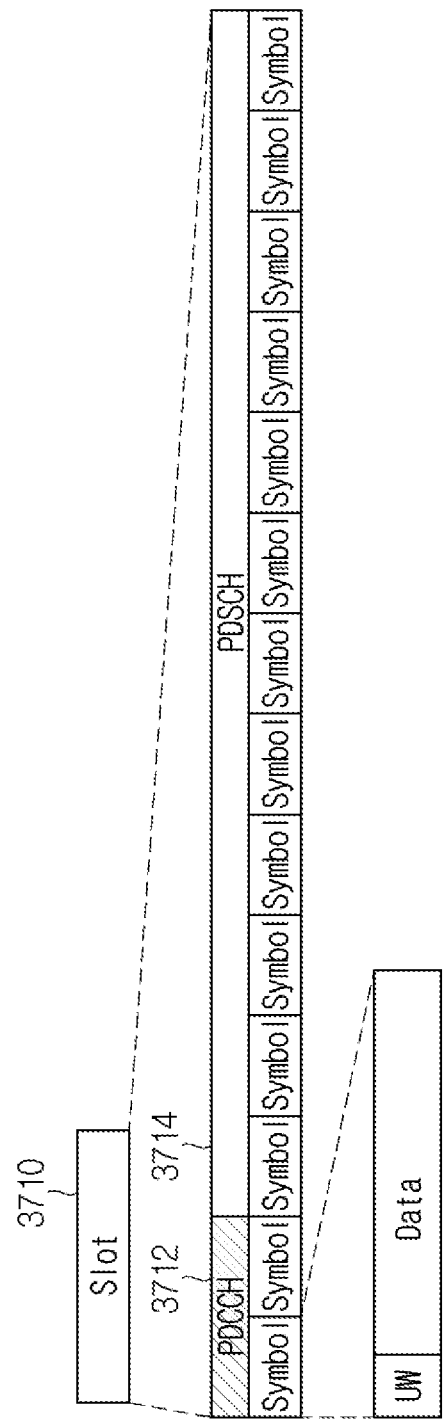
FIG. 37 is a diagram illustrating an example of a slot structure applicable to the present disclosure.

In the case of a 3GPP-series system, a slot may be configured as shown in FIG. 37 below: FIG. 37 is a diagram illustrating an example of a slot structure applicable to the present disclosure. Referring to FIG. 37, a slot 3710 includes a PDCCH 3712 and a PDSCH 3714. The PDCCH 3712 includes one or two OFDM symbols and is used to transmit control information necessary to receive the PDSCH 3714. The UW structure for the PDCCH 3712 may be semi-statically determined in a system configuration step. Control information on the configuration for the UW to be applied to each slot may be transmitted to the terminal through the PDCCH 3712. The terminal may detect data included in the OFDM symbol transmitted in the PDSCH 3714 based on the received information.

Figure 38:
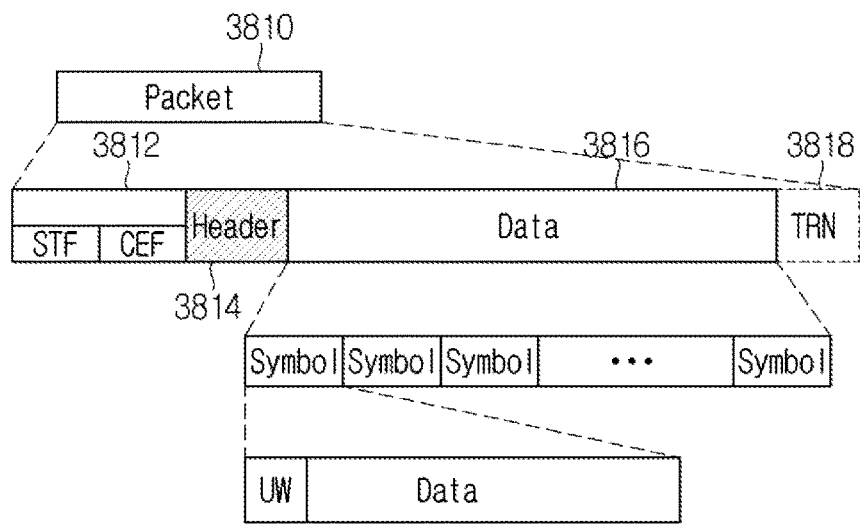
FIG. 38 is a diagram illustrating an example of a packet structure applicable to the present disclosure.

In the case of an IEEE 802.11-series system, a packet may be configured as shown in FIG. 38 below. FIG. 38 is a diagram illustrating an example of a packet structure applicable to the present disclosure. Referring to FIG. 38, a packet 3810 includes a preamble 3812, a header 3814, data 3816, and a training (TRN) 3818. The header 3814 is used for the purpose of transmitting information necessary to receive the data 3816. If control information for the configuration for the UW is added to the header 3814, the reception device may detect data included in each OFDM symbol based on the information on the configuration for the UW.

Figure 39:
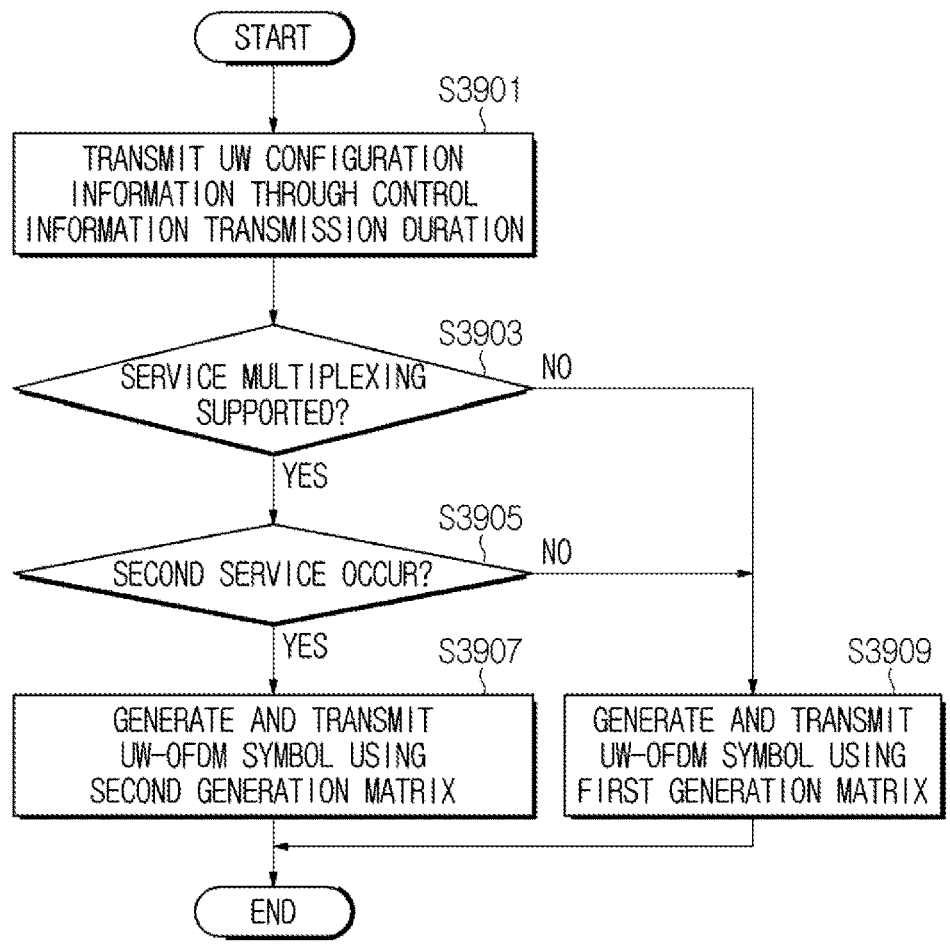
FIG. 39 is a diagram illustrating an embodiment of a procedure for transmitting a UW-OFDM symbol in consideration of UW adjustment in an apparatus applicable to the present disclosure.

FIG. 39 is a diagram illustrating an embodiment of a procedure for transmitting a UW-OFDM symbol in consideration of UW adjustment in an device applicable to the present disclosure. FIG. 39 illustrates an operation method of a base station transmitting a UW-OFDM symbol.

Referring to FIG. 39, in step S3901, the base station transmits information related to a configuration for a UW through a control information transmission duration. The information related to the configuration for the UW informs the terminal of the structure of the UW, and may include a value necessary for the terminal to determine at least one of the position, length or sequence of the UW.

In step S3903, the base station checks whether service multiplexing is supported. The base station checks whether different services (e.g., eMBB, URLLC) are supported. In other words, the base station checks whether a service that occupies a resource is supported using a preemption method.

That is, the base station checks whether a second service provided by reallocating a resource scheduled for a first service is supported. If service multiplexing is not supported, the base station proceeds to step S3909 below.

If service multiplexing is supported, in step S3905, the base station determines whether a second service occurs. In other words, the base station checks whether data of the second service is generated. The data of the second service may be generated after the resource for the first service is scheduled and before the data of the first service is transmitted through the scheduled resource.

When the second service occurs, in step S3907, the base station generates and transmits a UW-OFDM symbol using a second generation matrix. The second generation matrix is for generating a UW-OFDM symbol in which the first service and the second service are multiplexed, and is defined to form a zero UW in a duration of at least one UW and a slot duration of the second service. That is, the base station generates a first OFDM symbol for the first service including the zero UW using the second generation matrix, and inserts at least one UW and a signal for the second service at the position of the zero UW to generate a second OFDM symbol and then transmit the second OFDM symbol. In this case, in order to generate the signal for the second service, the base station may further use another generation matrix.

If the second service does not occur, in step S3907, the device generates and transmits a UW-OFDM symbol using the first generation matrix. The first generation matrix is for generating a UW-OFDM symbol providing only the first service, and is defined to form a zero UW in a duration of at least one UW. That is, the base station generates a first OFDM symbol for the first service including the zero UW using the first generation matrix, inserts at least one UW at a position of the zero UW to generate a second OFDM symbol, and then transmit the second OFDM symbol.

The terminal performing communication with the base station according to the embodiment described with reference to FIG. 39 may operate as follows. When receiving the data of the first service, the terminal may receive the data of the first service only by knowing whether the data of the second service is multiplexed. When receiving the data of the second service, the terminal may attempt to receive data based on a short scheduling unit for the second service. When the base station adaptively controls the UW, a procedure for the terminal to process the UW-OFDM symbol based on the control information is shown in FIG. 40 below.

Figure 40:
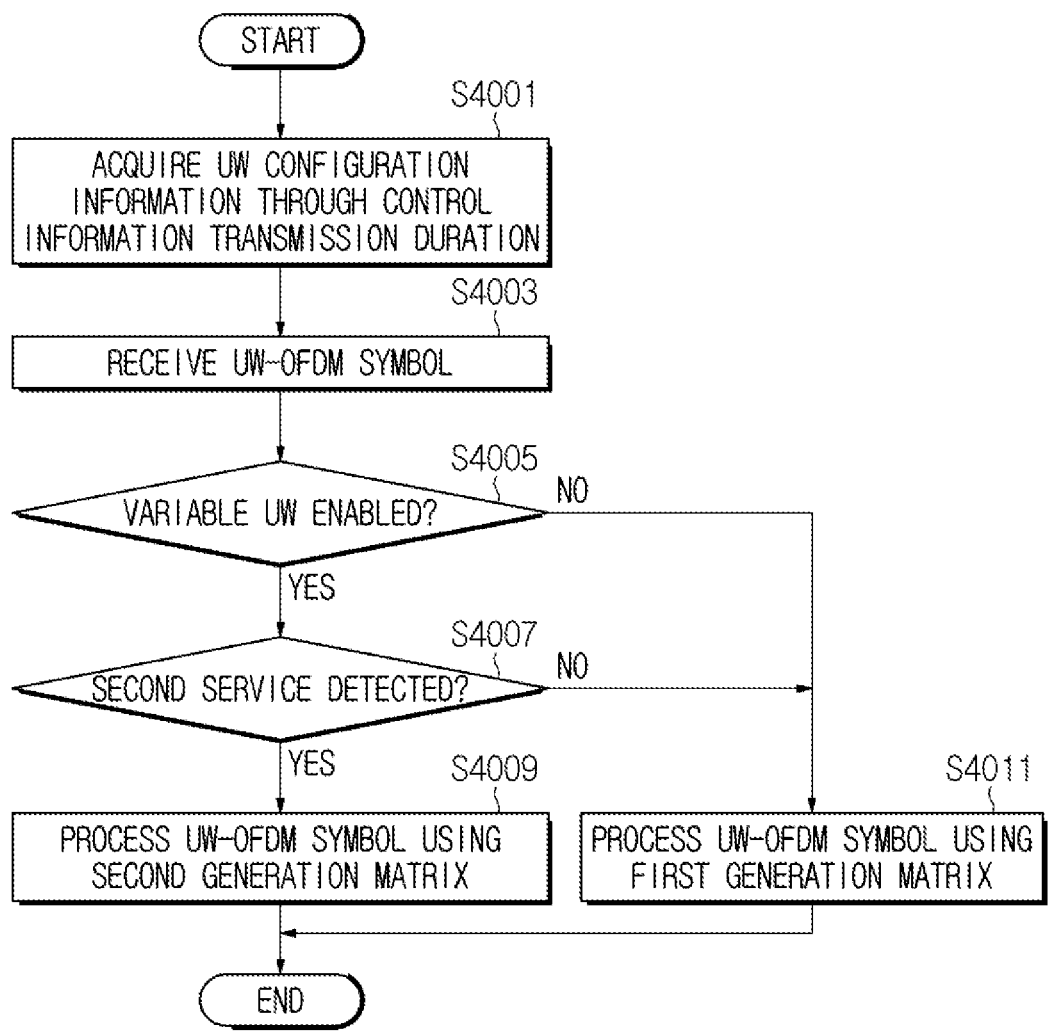
FIG. 40 is a diagram illustrating an embodiment of a procedure for receiving a UW-OFDM symbol in consideration of UW adjustment in an apparatus applicable to the present disclosure.

FIG. 40 is a diagram illustrating an embodiment of a procedure for receiving a UW-OFDM symbol in consideration of UW adjustment in an device applicable to the present disclosure. FIG. 40 shows an operation method of a terminal receiving a UW-OFDM symbol, which illustrates operations of a terminal receiving data of a first service.

Referring to FIG. 40, in step S4001, the terminal acquires information related to the configuration for the UW through a control information transmission duration. For example, the terminal may acquire the information related to the configuration for the UW included in the OFDM symbol through DCI. The information related to the configuration for the UW is for informing the terminal of the structure of the UW, and may include a value necessary for the terminal to determine at least one of the position, length, and sequence of the UW. In step S4003, the terminal receives a UW-OFDM symbol. A UW-OFDM symbol includes at least one UW.

In step S4005, the terminal determines whether a variable UW function is enabled. In other words, the terminal determines whether a function of multiplexing different services within a scheduling unit is supported. The variable UW function may be indicated by the information related to the configuration for the UW. That is, the terminal may determine whether the length of the UW in a current slot is capable of being changed based on the information received in step S4001. If the variable UW function is disabled, the terminal proceeds to step S4011 below.

If the variable UW function is enabled, in step S4007, the device determines whether a signal of the second service is detected. That is, when the length of the UW is capable of being changed within the slot, the terminal may preferentially attempt to detect the signal of the second service when receiving each OFDM symbol. According to an embodiment, when the second service is multiplexed, UWs may be transmitted before and after the data of the first service. Here, since the two UWs include the same sequence, when the signals of the two durations are auto-correlated, the terminal may determine whether two UWs are present in the corresponding durations. When two UWs are checked, the terminal may determine that the second service is multiplexed in the corresponding OFDM symbol. According to another embodiment, an indicator indicating whether the second service is multiplexed may be used. In this case, this step S4007 may be replaced with an operation of checking whether the second service is multiplexed through an indicator.

When the second service is detected, in step S4009, the terminal processes the UW-OFDM symbol using the second generation matrix. The second generation matrix corresponds to a precoder applicable when the second service is multiplexed in the OFDM symbol duration. For example, the terminal may equalize the received signal based on the second generation matrix, remove at least one UW, and estimate a data signal.

When the second service is not detected, in step S4011, the terminal processes the UW-OFDM symbol using the first generation matrix. The second generation matrix corresponds to a precoder applicable when the second service is not multiplexed in the OFDM symbol duration. For example, the terminal may equalize the received signal based on the first generation matrix, remove at least one UW, and estimate a data signal.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a $3^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a terminal in a wireless communication system, the method comprising:
   receiving information related to a configuration for symbols from a base station;
   receiving the symbols including data from the base station; and
   obtaining the data from the symbols based on the information related to the configuration,
   wherein the symbols comprise orthogonal frequency division multiplexing (OFDM) based symbols, and
   wherein the information related to the configuration comprises information related to a unique word (UW) of each of the symbols and is received through downlink control information (DCI).

2. The method of claim 1, wherein the information related to the configuration comprises at least one of information related to at least generation matrix for forming a zero UW, information related to whether a plurality of services is capable of being multiplexed or information indicating whether a plurality of services is multiplexed.

3. The method of claim 1, wherein the information related to the configuration indicates at least one of a length of a UW, a position of a UW, the number of UWs or a value of a sequence included in a UW.

4. The method of claim 1, wherein the obtaining the data comprises:
   determining a generation matrix based on the information related to the configuration;
   equalizing received signals included in the UW-OFDM symbols based on the generation matrix; and
   estimating a data signal from the equalized received signals.

5. The method of claim 1, further comprising:
   determining whether a plurality of services is multiplexed, for each of the UW-OFDM symbols; and
   selecting a generation matrix to be used, based on whether the plurality of services is multiplexed.

6. The method of claim 5, wherein the determining whether the plurality of services is multiplexed comprises identifying whether the same UW as a UW located at a rear end of a UW-OFDM symbol is present at a predefined position.

7. The method of claim 5, wherein the determining whether the plurality of services is multiplexed comprises identifying whether an indicator indicating whether the plurality of services is multiplexed is received.

8. The method of claim 1, wherein the receiving the information related to the configuration comprises:

receiving first control information including information related to candidates of the configuration for an available UW; and receiving second control information indicating a configuration to be used among the candidates.

9. A method of operating a base station in a wireless communication system, the method comprising:
transmitting information related to a configuration for symbols; and
generating the symbols according to the configuration; and
transmitting the symbols,
wherein the symbols comprise orthogonal frequency division multiplexing (OFDM) based symbols, and
wherein the information related to the configuration comprises information related to a unique word (UW) of each of the symbols and is transmitted through downlink control information (DCI).

10. The method of claim 9, wherein the information related to the configuration comprises at least one of information related to at least one generation matrix for forming a zero UW, information related to whether a plurality of services is capable of being multiplexed or information indicating whether a plurality of services is multiplexed.

11. The method of claim 9, wherein the information related to the configuration indicates at least one of a length of a UW, a position of a UW, the number of UWs and a value of a sequence included in a UW.

12. The method of claim 9, further comprising:
determining whether a plurality of services is multiplexed, for each of the UW-OFDM symbols; and
selecting a generation matrix to be used, based on whether the plurality of services is multiplexed.

13. The method of claim 12, further comprising inserting the same UW as a UW located at a rear end of a UW-OFDM symbol at a predefined position, when the plurality of services is multiplexed.

14. The method of claim 12, further comprising transmitting an indicator indicating whether the plurality of services is multiplexed.

15. The method of claim 9, wherein the transmitting the information related to the configuration for the symbols comprises:
transmitting first control information including information related to candidates of the configuration for an available UW and transmitting second control information indicating a configuration to be used among the candidates.

16. A terminal in a wireless communication system, the terminal comprising:
a transceiver; and
at least one processor coupled to the transceiver and configured to:
receive information related to a configuration for symbols from a base station;
receive the symbols including data from the base station; and
obtain the data from the symbols based on the information related to the configuration,
wherein the symbols comprise orthogonal frequency division multiplexing (OFDM) based symbols, and
wherein the information related to the configuration comprises information related to a unique word (UW) of each of the symbols and is received through downlink control information (DCI).

17. The terminal of claim 16, wherein the information related to the configuration comprises at least one of information related to at least generation matrix for forming a zero UW, information related to whether a plurality of services is capable of being multiplexed or information indicating whether a plurality of services is multiplexed.

18. The terminal of claim 16, wherein the information related to the configuration indicates at least one of a length of a UW, a position of a UW, the number of UWs or a value of a sequence included in a UW.

19. The terminal of claim 16, wherein the at least one processor is further configured to:
determine whether a plurality of services is multiplexed, for each of the UW-OFDM symbols; and
select a generation matrix to be used, based on whether the plurality of services is multiplexed.

20. The terminal of claim 16, wherein the at least one processor is further configured to:
receive first control information including information related to candidates of the configuration for an available UW; and
receive second control information indicating a configuration to be used among the candidates.

* * * * *